(12) United States Patent
Aronzon et al.

(10) Patent No.: US 9,861,893 B2
(45) Date of Patent: *Jan. 9, 2018

(54) APPARATUS FOR ADAPTING VIRTUAL GAMING WITH REAL WORLD INFORMATION

(71) Applicant: STEELSERIES APS, Valby (DK)

(72) Inventors: Michael Aronzon, Vaughan (CA); Bruce Hawver, Hawthorn Woods, IL (US); Francis Arnold Grever, Palatine, IL (US)

(73) Assignee: STEELSERIES ApS, Frederiksberg (DK)

( * ) Notice: Subject to any disclaimer, the term of this patent is extended or adjusted under 35 U.S.C. 154(b) by 208 days.

This patent is subject to a terminal disclaimer.

(21) Appl. No.: 14/852,002

(22) Filed: Sep. 11, 2015

(65) Prior Publication Data

US 2016/0001175 A1 Jan. 7, 2016

Related U.S. Application Data

(63) Continuation of application No. 13/232,310, filed on Sep. 14, 2011, now Pat. No. 9,155,964.

(51) Int. Cl.
*A63F 9/00* (2006.01)
*A63F 13/65* (2014.01)
(Continued)

(52) U.S. Cl.
CPC .............. *A63F 13/65* (2014.09); *A63F 13/06* (2013.01); *A63F 13/12* (2013.01); *A63F 13/213* (2014.09);
(Continued)

(58) Field of Classification Search
None
See application file for complete search history.

(56) References Cited

U.S. PATENT DOCUMENTS

| 5,208,449 A | * | 5/1993 | Eastman | ............ G06K 7/10891 |
| | | | | 235/462.3 |
| 5,214,615 A | * | 5/1993 | Bauer | ..................... G06F 3/011 |
| | | | | 367/128 |

(Continued)

OTHER PUBLICATIONS

"Dates Near Me", www.datesnearme.com, Sep. 14, 2011.
(Continued)

*Primary Examiner* — Seng H Lim
(74) *Attorney, Agent, or Firm* — Guntin & Gust, PLC; Douglas Schnabel

(57) ABSTRACT

A server device that incorporates teachings of the present disclosure may include, for example, a memory and a processor. The processor can identify first and second players present at first and second physical locations, to identify first and second boundary and topographical information of the first and second physical locations, to map the first and second boundary and topographical information of the first and second physical locations to a virtual gaming space, to capture first and second position and orientation information for the first and second players, to map the first and second position and orientation information to the virtual gaming space, to generate first and second virtual players corresponding to the first and second players, and to transmit to first goggles information representative of the second virtual player for display superimposed onto a transparent viewing apparatus for viewing of the virtual gaming space. Additional embodiments are disclosed.

20 Claims, 15 Drawing Sheets

(51) Int. Cl.

| | |
|---|---|
| *A63F 13/35* | (2014.01) |
| *A63F 13/25* | (2014.01) |
| *A63F 13/87* | (2014.01) |
| *A63F 13/30* | (2014.01) |
| *A63F 13/213* | (2014.01) |
| *A63F 13/216* | (2014.01) |
| *A63F 13/428* | (2014.01) |
| *A63F 13/825* | (2014.01) |
| *A63F 13/20* | (2014.01) |
| *A63F 13/211* | (2014.01) |

(52) U.S. Cl.
CPC ............ *A63F 13/216* (2014.09); *A63F 13/25* (2014.09); *A63F 13/30* (2014.09); *A63F 13/35* (2014.09); *A63F 13/428* (2014.09); *A63F 13/825* (2014.09); *A63F 13/87* (2014.09); *A63F 13/211* (2014.09); *A63F 2300/105* (2013.01); *A63F 2300/205* (2013.01); *A63F 2300/5573* (2013.01); *A63F 2300/572* (2013.01); *A63F 2300/69* (2013.01); *A63F 2300/695* (2013.01); *A63F 2300/8023* (2013.01); *A63F 2300/8076* (2013.01); *A63F 2300/8082* (2013.01)

(56) References Cited

U.S. PATENT DOCUMENTS

| | | | | |
|---|---|---|---|---|
| 5,347,400 | A * | 9/1994 | Hunter | G02B 3/08 345/7 |
| 5,563,988 | A * | 10/1996 | Maes | G06F 3/011 345/421 |
| 5,641,288 | A * | 6/1997 | Zaenglein, Jr. | F41G 3/2633 434/17 |
| 6,127,990 | A * | 10/2000 | Zwern | G09B 21/008 345/158 |
| 6,159,100 | A * | 12/2000 | Smith | A63F 13/10 434/55 |
| 6,166,744 | A | 12/2000 | Jaszlics | |
| 6,727,884 | B1 | 4/2004 | Leatham et al. | |
| 7,073,129 | B1 * | 7/2006 | Robarts | G06Q 10/10 463/36 |
| 7,095,422 | B2 * | 8/2006 | Shouji | G06T 15/50 345/629 |
| 7,289,130 | B1 * | 10/2007 | Satoh | A63F 13/10 345/629 |
| 7,391,424 | B2 * | 6/2008 | Lonsing | G06T 15/00 345/633 |
| 7,770,117 | B1 | 8/2010 | Uy et al. | |
| 8,195,084 | B2 * | 6/2012 | Xiao | B63C 11/02 434/4 |
| 8,264,505 | B2 * | 9/2012 | Bathiche | A63F 13/10 345/629 |
| 8,348,760 | B2 | 1/2013 | Mao et al. | |
| 8,562,435 | B2 * | 10/2013 | Soelberg | A63F 13/95 345/173 |
| 8,767,014 | B2 | 7/2014 | Vaught et al. | |
| 2003/0064712 | A1 | 4/2003 | Gaston | |
| 2004/0002843 | A1 | 1/2004 | Robarts et al. | |
| 2004/0110565 | A1 | 6/2004 | Levesque | |
| 2004/0164897 | A1 | 8/2004 | Treadwell et al. | |
| 2005/0130739 | A1 | 6/2005 | Argentar | |
| 2005/0227764 | A1 | 10/2005 | Cantu et al. | |
| 2007/0015586 | A1 * | 1/2007 | Huston | A63B 24/0021 463/42 |
| 2008/0024597 | A1 * | 1/2008 | Yang | A63F 13/02 348/53 |
| 2008/0081692 | A1 * | 4/2008 | Pope | A63F 13/06 463/31 |
| 2009/0221368 | A1 | 9/2009 | Yen | |
| 2009/0221374 | A1 * | 9/2009 | Yen | A63F 13/06 463/42 |
| 2009/0305765 | A1 | 12/2009 | Walker et al. | |
| 2009/0319175 | A1 | 12/2009 | Khosravy et al. | |
| 2009/0325699 | A1 * | 12/2009 | Delgiannidis | A63F 13/06 463/32 |
| 2010/0045928 | A1 * | 2/2010 | Levy | H04M 1/05 351/158 |
| 2010/0226535 | A1 | 9/2010 | Kimchi et al. | |
| 2010/0240454 | A1 * | 9/2010 | Xiao | A63G 21/20 463/30 |
| 2010/0240988 | A1 | 9/2010 | Varga et al. | |
| 2010/0285877 | A1 * | 11/2010 | Corazza | A63F 13/35 463/32 |
| 2010/0287485 | A1 | 11/2010 | Bertolami et al. | |
| 2010/0304804 | A1 | 12/2010 | Spivack | |
| 2011/0010676 | A1 | 1/2011 | Khosravy et al. | |
| 2011/0028194 | A1 | 2/2011 | Tang et al. | |
| 2011/0151955 | A1 | 6/2011 | Nave | |
| 2011/0195782 | A1 | 8/2011 | Mao et al. | |
| 2011/0310120 | A1 | 12/2011 | Narayanan | |
| 2012/0015730 | A1 * | 1/2012 | Watkins, Jr. | A63F 13/65 463/36 |
| 2012/0113209 | A1 * | 5/2012 | Ritchey | H04N 5/2254 348/14.02 |
| 2012/0299817 | A1 | 11/2012 | Atkins et al. | |
| 2013/0050432 | A1 | 2/2013 | Perez et al. | |
| 2013/0083003 | A1 | 4/2013 | Perez et al. | |
| 2013/0093788 | A1 | 4/2013 | Liu et al. | |
| 2013/0147836 | A1 | 6/2013 | Small et al. | |
| 2013/0205206 | A1 * | 8/2013 | Hawver | G06F 9/485 715/704 |
| 2017/0113141 | A1 | 4/2017 | Aronzon et al. | |

OTHER PUBLICATIONS

"MagiQuest", http://magiquest.com, Sep. 14, 2011.
"World of WarCraft Cataclysm", http://us.battle.net/wow/en, Sep. 14, 2011.
Azuma, , "Recent Advances in Augmented Reality", IEEE Computer Graphics and Applications, IEEE Service Center. New York. NY. US. vol. 21. No. 6., Nov. 1, 2001 (Nov. 1, 2001). pp. 34-47.
Thomas, , "First Person Indoor/Outdoor Augmented Reality Application: ARQUake", Personal and Ubiquitous Computing Springer Verlag, London, GB., vol. 6. No. 1., Feb. 1, 2002 (Feb. 1, 2002 ), pp. 75-86.

\* cited by examiner

400

1100

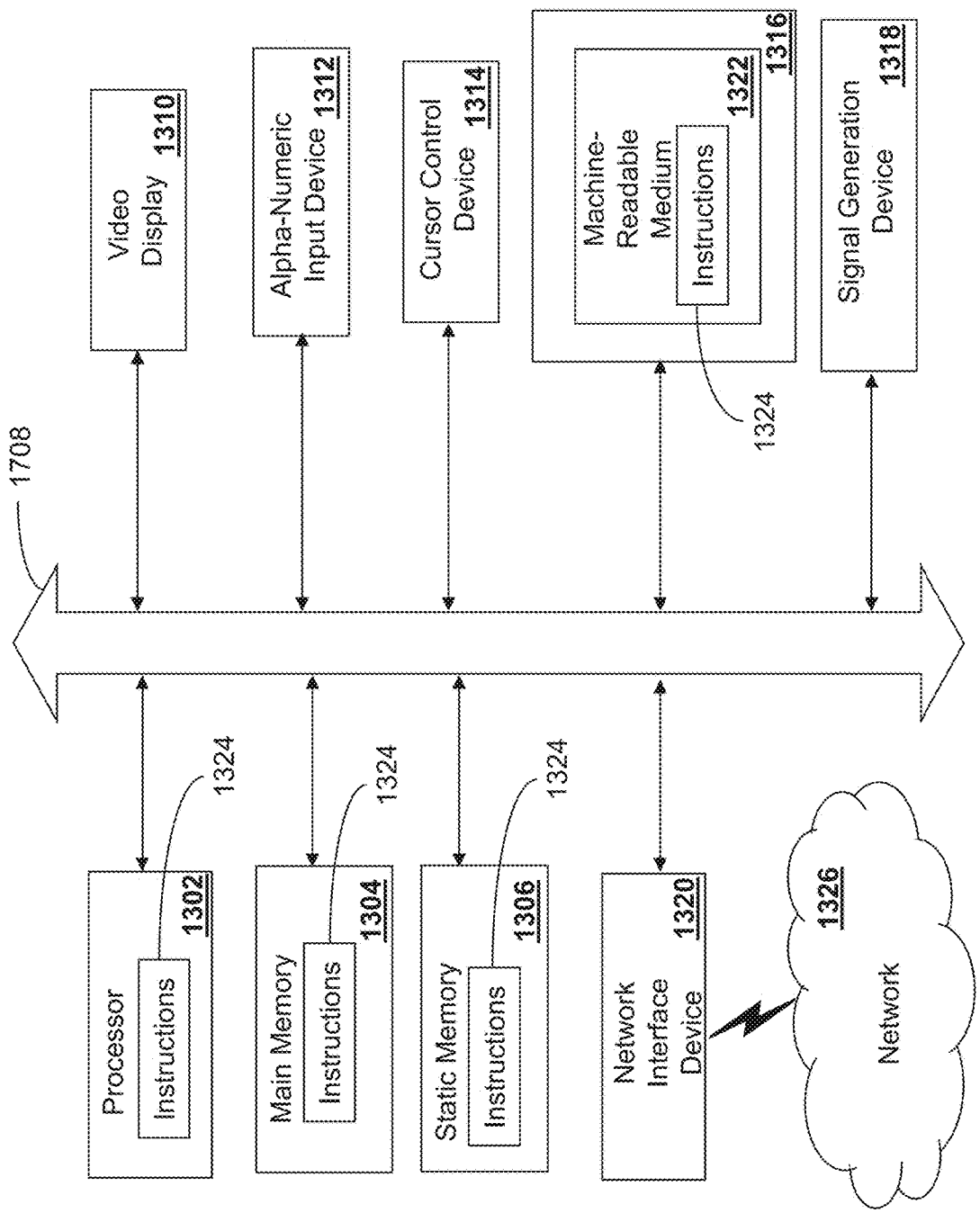

APPARATUS FOR ADAPTING VIRTUAL GAMING WITH REAL WORLD INFORMATION

CROSS-REFERENCE TO RELATED APPLICATIONS

This application is a Continuation of and claims priority to U.S. patent application Ser. No. 13/232,310, filed Sep. 14, 2011. The contents of the foregoing are hereby incorporated by reference into this application as if set forth herein in full.

FIELD OF THE DISCLOSURE

The present disclosure relates generally to an apparatus for adapting virtual gaming with real world information.

BACKGROUND

Electronic games are commonly played on gaming systems, such as a controller box coupled to a display screen or a computer device with an integrated display screen (laptop, mobile phone). Gamers typically engage other players on their system or play against computer-generated players. Gamers also frequently play along with other players in Massively Multiplayer On-line (MMO) games in team or individual competition. Gamers can have at their disposal accessories such as a keyboard, a general purpose gaming pad, a mouse, a gaming console controller, a headset with a built-in microphone to communicate with other players, a joystick, a computer display, or other common gaming accessories. Gamers commonly use such accessories to enjoy the gaming experience from their homes while participating in the gaming experienced generated and displayed on their gaming systems.

BRIEF DESCRIPTION OF THE DRAWINGS

FIG. 13 depicts an illustrative diagrammatic representation of a machine in the form of a computer system within which a set of instructions, when executed, may cause the machine to perform any one or more of the methodologies disclosed herein.

DETAILED DESCRIPTION

Figure 1A:
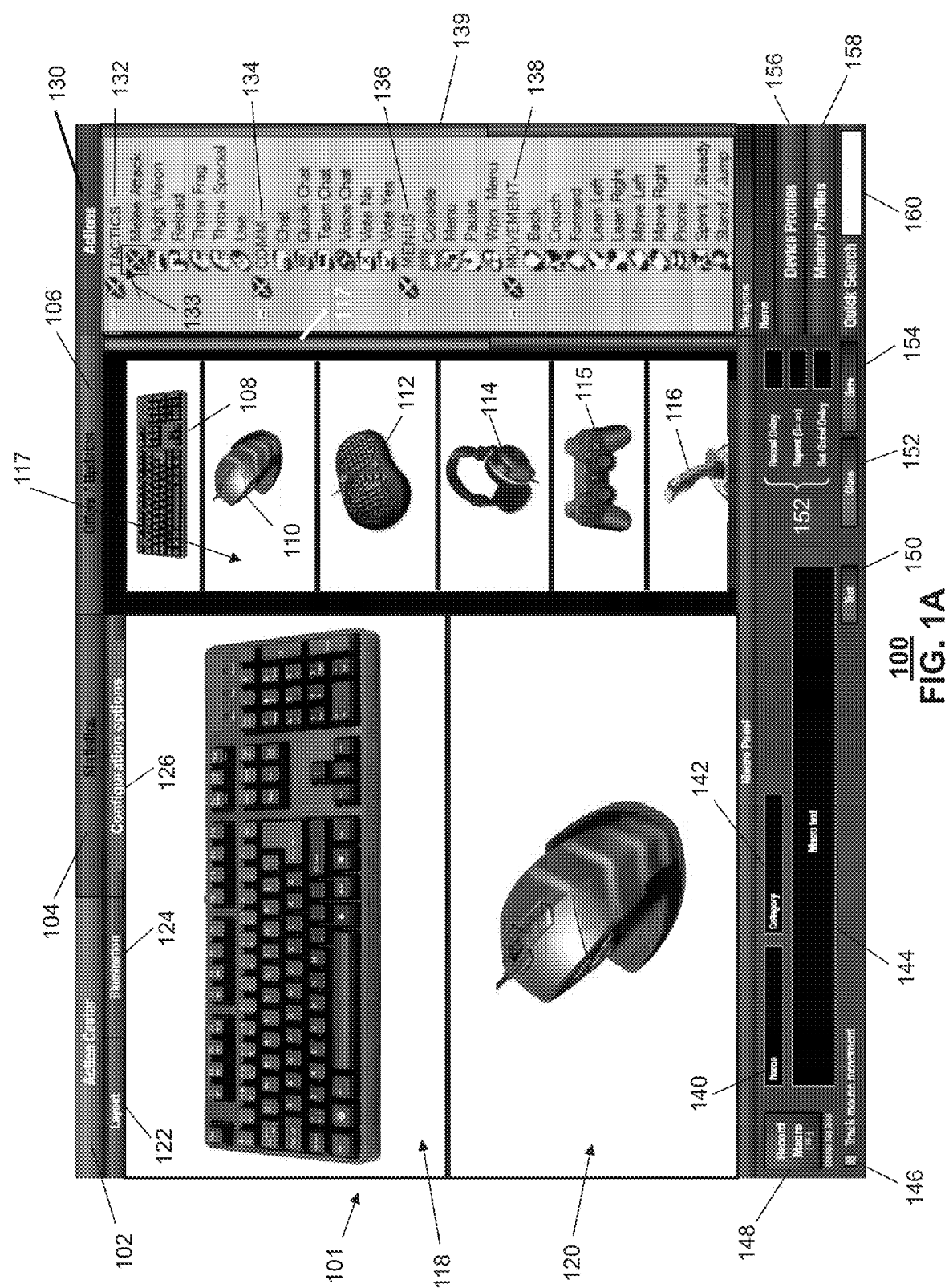
FIGS. 1A, 1B, 2A, 2B, and 3 depict illustrative embodiments of a Graphical User Interface (GUI) generated by an Accessory Management Software (AMS) application according to the present disclosure.

One embodiment of the present disclosure includes a server device having a memory and a processor. The processor can be operable to identify a first player physically present at the first physical location and a second player physically present at a second physical location. The first and second physical locations can disparate locations. The processor can also be operable to identify first boundary and topographical information of the first physical location and second boundary and topographical information of the second physical location. The processor can further be operable to map the first boundary and topographical information of the first physical location and the second boundary and topographical information of the second physical location to a virtual gaming space. The processor can be operable to capture first position and orientation information for the first player at the first physical location and second position and orientation information for the second player at the second physical location. The processor can also be operable to map the first position and orientation information for the first player and the second position and orientation information for the second player to the virtual gaming space. The processor can be further operable to generate a first virtual player corresponding to the first player and a second virtual player corresponding to the second player. The processor can be operable to transmit to first goggles of the first player information representative of the second virtual player. In turn, the first goggles can display the second virtual player superimposed onto a transparent viewing apparatus for viewing of the virtual gaming space.

One embodiment of the present disclosure includes a computer-readable storage medium including computer instructions. The computer instructions can identify a first player device physically present at a physical location. The computer instructions can also identify boundary and topographical information of the physical location. The computer instructions can further map the boundary and topographical information of the physical location to a virtual gaming space. The computer instructions can generate a virtual structure corresponding to the virtual gaming space. The computer instructions can also capture first position and orientation information for the first player device at the physical location. The computer instructions can map the first position and orientation information for the first player device to the virtual gaming space to generate a first virtual player corresponding to the first player device. The computer instructions can further transmit to the first player device information representative of the first virtual player. In turn, the first player device can display the first virtual player in the virtual structure.

One embodiment of the present disclosure includes a goggle apparatus having a memory and a processor. The processor can be operable to detect first position and orientation information relative to first boundary and topographical information of a first physical location for a first player physically present and wearing the goggle apparatus. The processor can also be operable to receive information representative of a virtual player at a virtual gaming space corresponding to a mapping of second boundary and topographical information of the second physical location and the first boundary and topographical information of the first physical location. The virtual player corresponds to second position and orientation information for a second player physically present at a second physical location. The processor can further be operable to display the virtual player superimposed onto a transparent viewing element for viewing of the virtual gaming space.

FIGS. 1A, 1B, 2A, 2B, and 3 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, a gaming server, or a gaming console. A gaming console can represent a gaming box such as a PlayStation 3™, a Wii™, or an Xbox360™. Other present and next generation gaming consoles are contemplated. The AMS application can also operate in other computing devices with less computing resources such as a cellular phone, a personal digital assistant, or a media player (such as an iPod™, an iPAD™, etc.). From these illustrations it would be apparent to an artisan with ordinary skill in the art that the AMS application can operate in any device with computing resources.

Figure 2A:
Figure 2B:
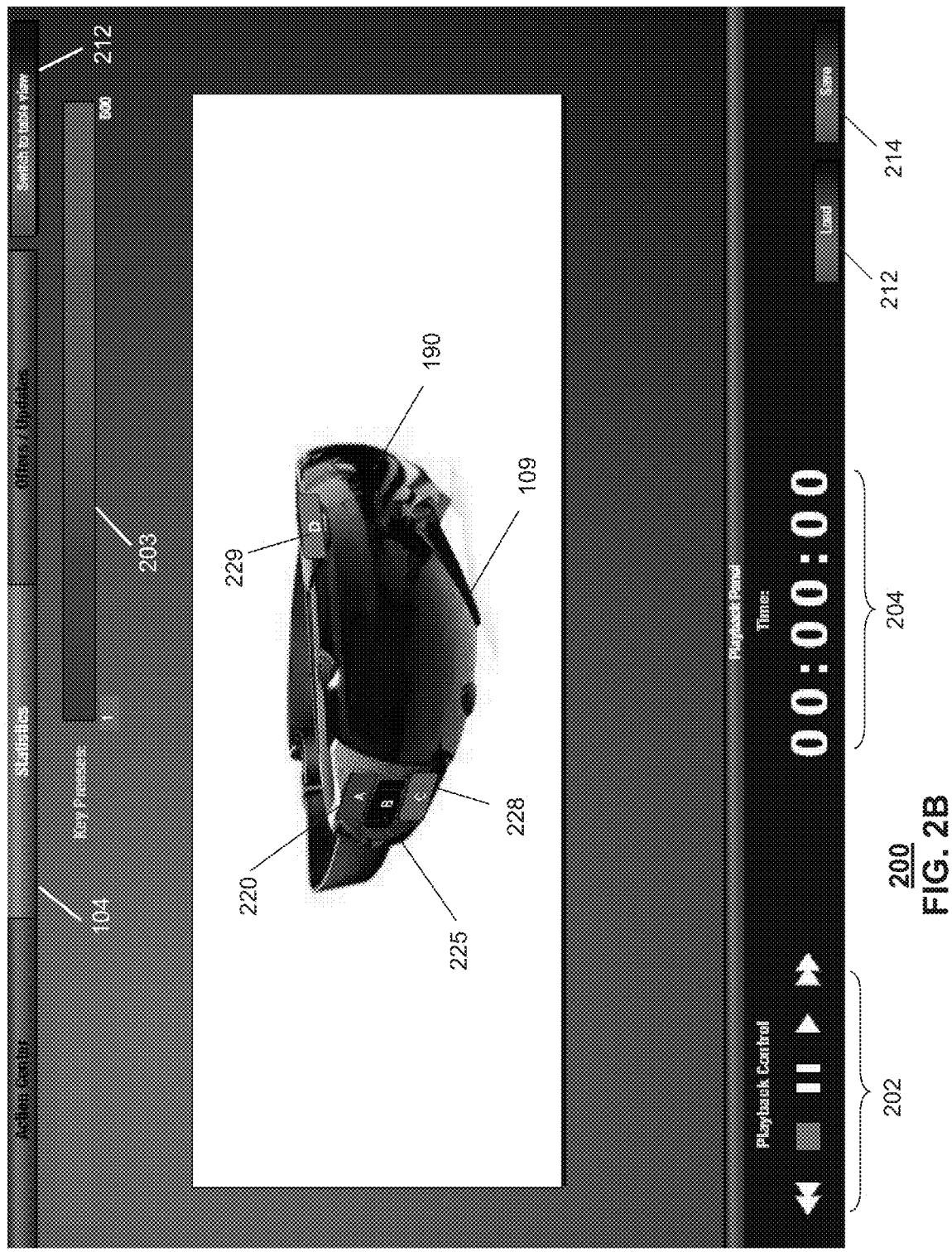
Figure 3:
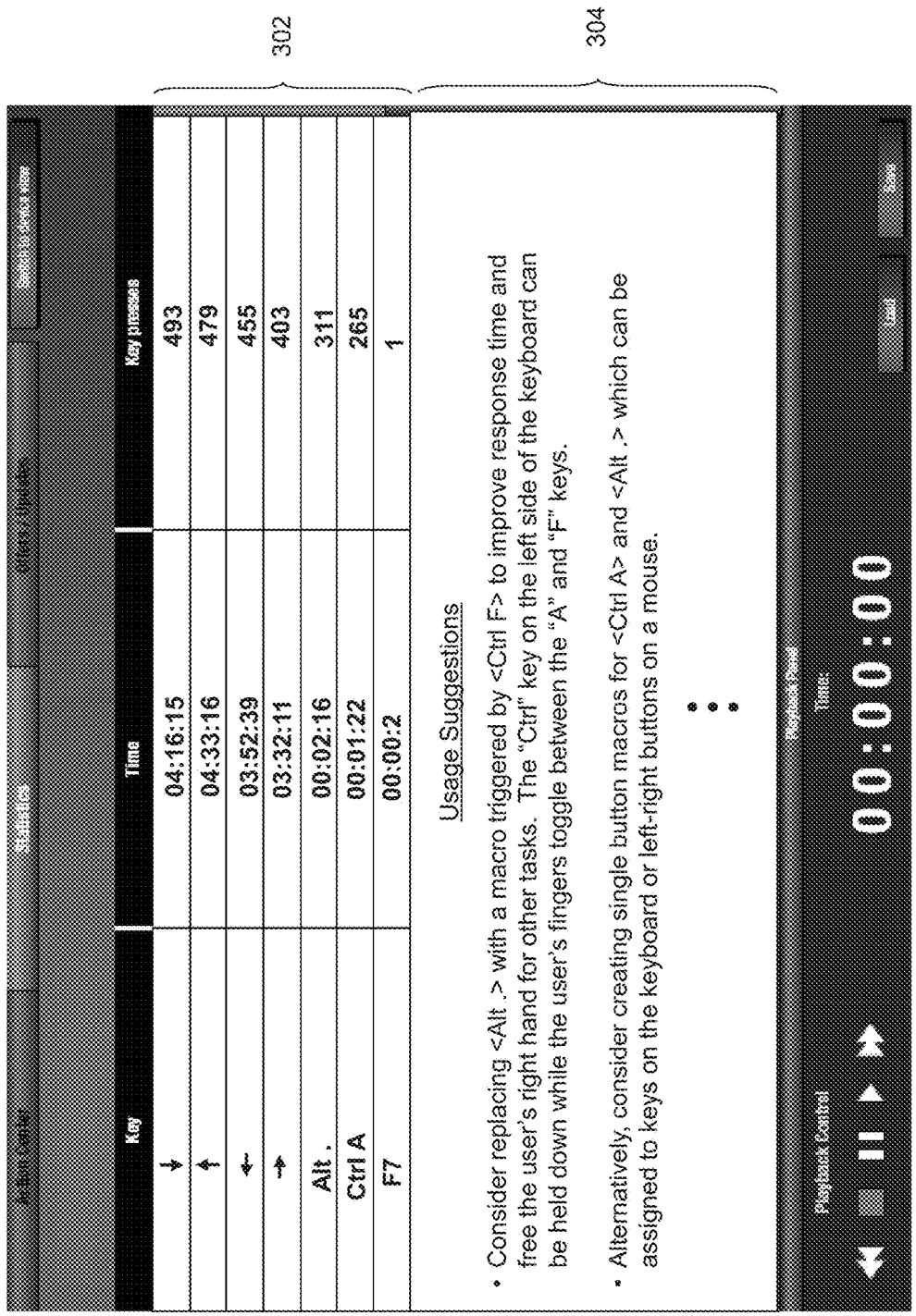
Figure 4:
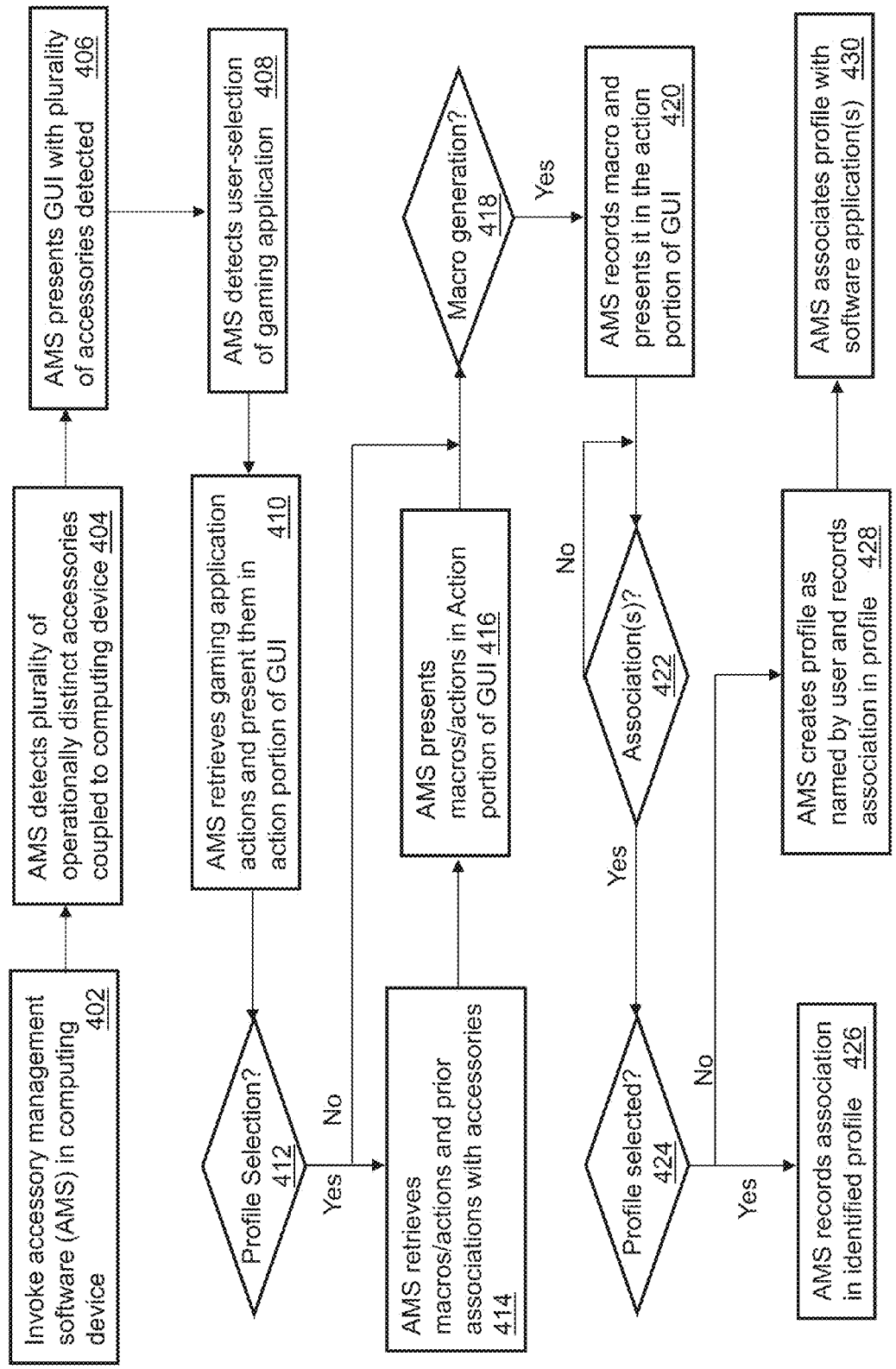
FIGS. 4-6 depict illustrative methods describing the operation of the AMS application.
Figure 5:
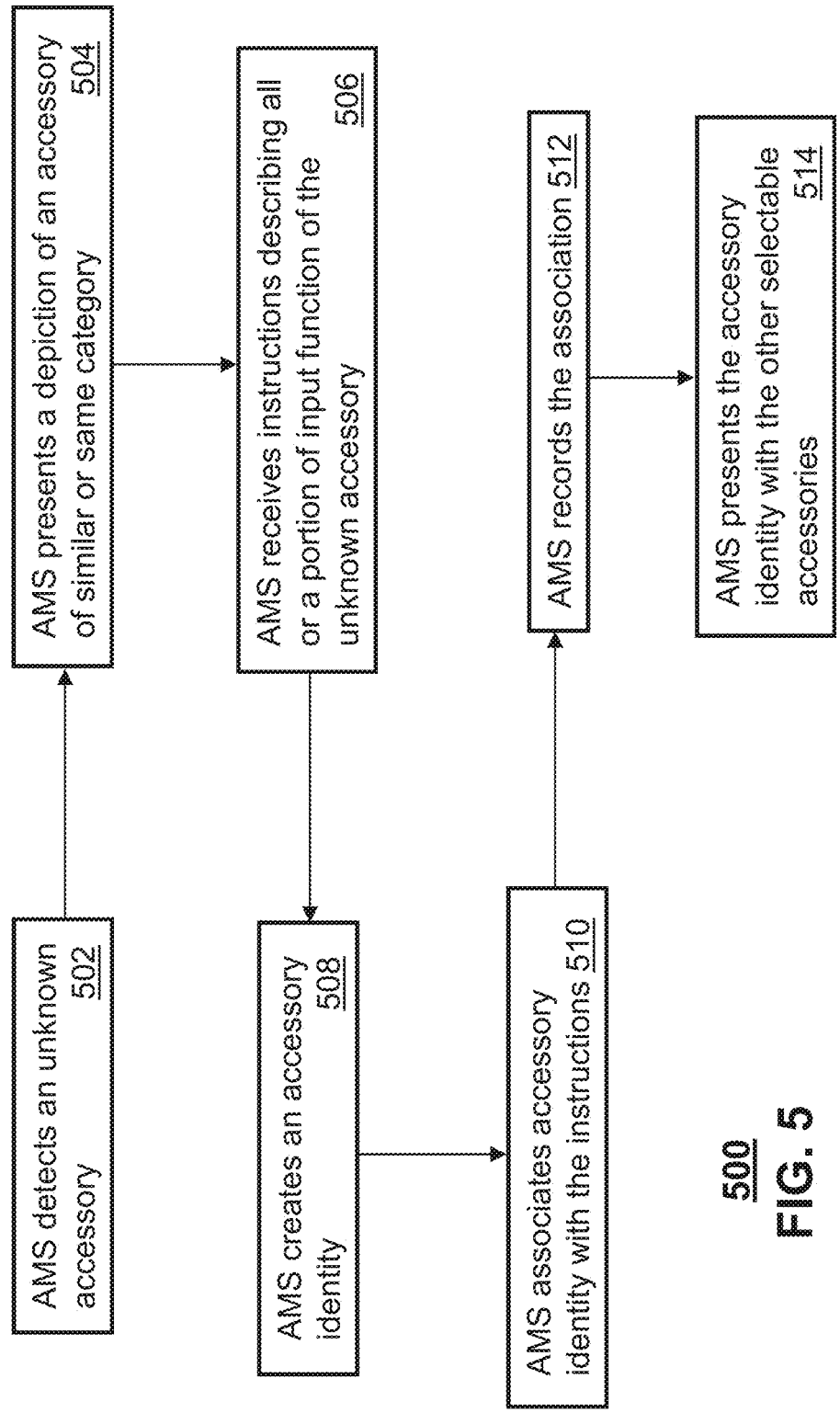
Figure 6:
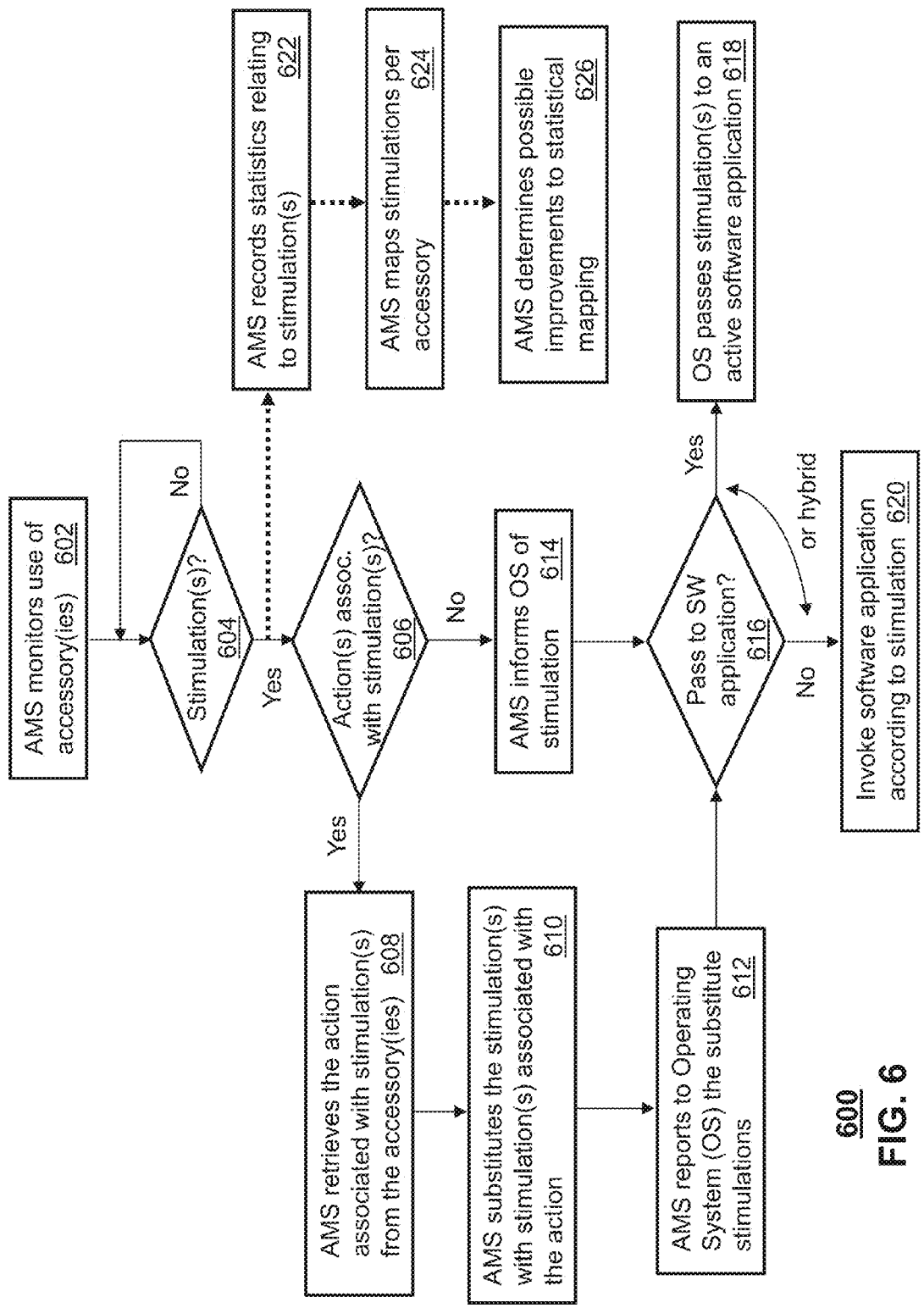

FIGS. 4-6 depict illustrative methods 400-600 describing the operation of the AMS application as shown in FIGS. 1-3. Method 400 can begin with step 402 in which the AMS application is invoked in a computing device. The invocation step can result from a user selection of the AMS application from a menu or iconic symbol presented on a desktop of the computing device by an operating system (OS) managing operations thereof. In step 404, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—Wi-Fi), a mobile cellular network, or combinations thereof.

In the present context, an accessory can represent any type of device which can be communicatively coupled to the computing device and which can control aspects of the OS and/or a software application operating in the computing device. An accessory can represent for example a keyboard, a gaming pad, a mouse, a gaming console controller, a joystick, a microphone, or a headset with a microphone—just to mention a few. An accessory can also represent for example, gaming goggles or apparel with sensors.

The keyboard and gaming pad represent accessories of a similar category since their operational parameters are alike. A mouse, on the other hand, represents an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories. The joysticks, game controllers or any other input devices represent additional categories of accessories supported by the AMS.

In step 406, the AMS application presents a GUI 101 such as depicted in FIG. 1A with operationally distinct accessories such as the keyboard 108 and mouse 110. The GUI 101 presents the accessories 108-116 in a scrollable section 117. One or more accessories can be selected by a user with a common mouse pointer. In this illustration, the keyboard 108 and mouse 110 were selected with a mouse pointer for customization. Upon selecting the keyboard 108 and mouse 110 in section 117, the AMS application can present the keyboard 108 and mouse 110 in split windows 118, 120, respectively, to help the user during the customization process. Alternatively, gaming goggles 109 and a headset 111 can be selected and presented in the split windows 118 and 120, respectively. For example, the selected gaming goggles 109 can include buttons "A" 180, "B" 185, "C" 188, and "D" 189 and a viewing apparatus "190". The viewing apparatus 190 can utilize, for example, liquid crystal display technology to superimpose virtual gaming information (e.g., avatar representative of another player, virtual objects or obstructions, etc.) onto a transparent viewing display which enables a gamer to see real-world objects in a location of the gamer.

In step 408, the AMS application can be programmed to detect a user-selection of a particular software application such as a game. This step can be the result of the user entering in a Quick Search field 160 the name of a gaming application (e.g., World of Warcraft™). Upon identifying a gaming application, the AMS application can retrieve in step 410 from a remote or local database gaming application actions which can be presented in a scrollable section 139 of the GUI represented as "Actions" 130. The actions can be tactical actions 132, communication actions 134, menu actions 136, and movement actions 138, or any other types of actions, which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or mouse 110 to make an association with an input function of one of these accessories.

For example, the user can drag the Melee Attack symbol to the right mouse button thereby causing an association between the selection of the right mouse button and the gaming action of a Melee Attack. When the right button of the mouse 110 is selected during normal operation, the AMS application can detect the selection as a "trigger" to generate the key sequence "Ctrl A" which is understood by the gaming application as request for a Melee Attack. The gaming application receives from the AMS application by way of an operating system the "Ctrl A" sequence as if it had been generated by a Qwerty keyboard.

As another example, the user can associate a function with button "A" 180 on the gaming goggles 109. For instance the user can select the "Team Chat" function under the "Comm" subsection 134 of the "Actions" section 130 section of the GUI. The "Team Chat" icon can be selected by holding down a mouse button and dragging the icon symbol to the "A" button 180 on the gaming goggles 109 to thereby associate presses of the "A" button 180 with the "Team Chat" function. During a game, the AMS application can detect pressing of the "A" button 180 and substitute the "Team Chat" function. In another example, the user can use the AMS application to associate a key press on the headset 111 or on a gaming accessory 113, such as a virtual gaming gun 113, with a gaming function. The user can use the AMS application to associate a single button press on the gaming goggles 109, the headset 111, or the gaming accessory 113 to a single substitute function or to a series of substitute functions.

With this in mind, attention is directed to step 412 where the AMS application can respond to a user selection of a profile. A profile can be a device profile or master profile invoked by selecting GUI button 156 or 158, each of which can identify the association of actions with input functions of one or more accessories. If a profile selection is detected in step 412, the AMS application can retrieve macro(s) and/or prior associations of actions with the accessories as defined by the profile. The actions and/or macros defined in the profile can also be presented in step 416 by the AMS application in the actions column 130 of the GUI 101 to modify or create new associations.

In step 418, the AMS application can also respond to a user selection to create a macro. A macro in the present context can represent a subset of actions that can be presented in the Actions column 130. Any command which can be recorded by the AMS application can be used to define a macro. A command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS. A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, a mouse pad, a pair of gaming goggles, or a gaming accessory, and so on. In another embodiment, macros can be Macros can also be combinations of the above illustrations. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, etc.) and/or by manual entry in field 144 (e.g., typing the name and location of a software application to be initiated by an OS). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to customize such timing. Once the macro has been fully defined, selection of button 154 records the macro in step 420. The recording step can be combined with a step for adding the macro to the associable items Actions column 130, thereby providing the user the means to associate the macro with input functions of the accessories.

In step 422, the AMS application can respond to drag and drop associations between actions and input functions of the keyboard 108 and the mouse 110. If an association is detected, the AMS application can proceed to step 424 where it can determine if a profile has been identified in step 412 to record the association(s) detected. If a profile has been identified, the associations are recorded in said profile in step 426. If a profile was not been identified in step 412, the AMS application can create a profile in step 428 for recording the detected associations. In the same step, the user can name the newly created profile as desired. The newly created profile can also be associated with one or more software applications in step 430 for future reference.

Figure 1B:
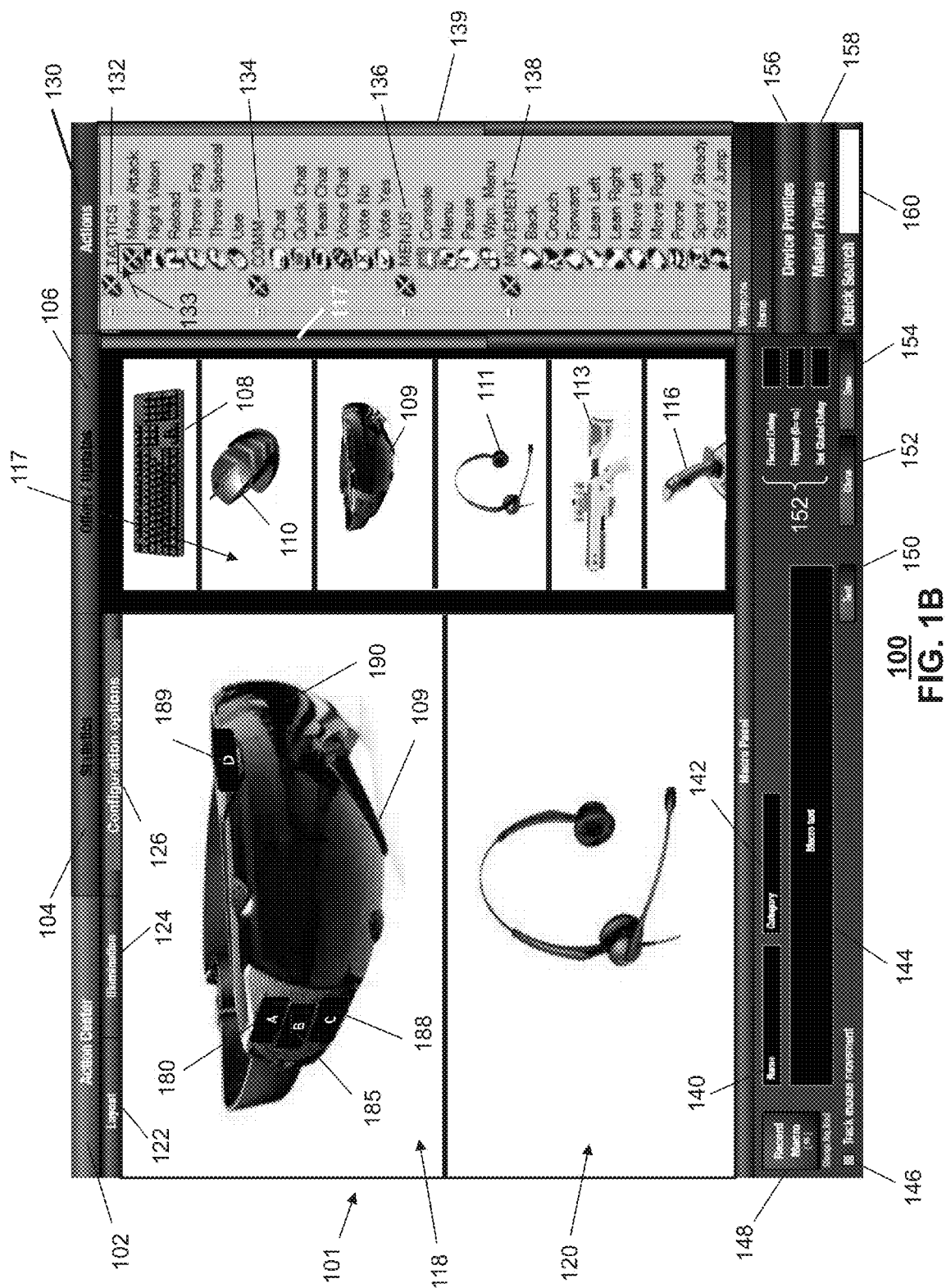

The GUI 101 presented by the AMS application can have other functions. For example, the GUI 101 can provide options for layout of the accessory selected (button 122), how the keyboard is illuminated when associations between input functions and actions are made (button 134), and configuration options for the accessory (button 126). Configuration options can include operational settings of the mouse 110 such as Dots-per-Inch or Counts-per-Inch, and so on. The AMS application can adapt the GUI 101 to present more than one functional perspective. For instance, by selecting button 102, the AMS application can adapt the GUI 101 to present a means to create macros and associate actions to accessory input functions as depicted in FIGS. 1A and 1B. Selecting button 104 can cause the AMS application to adapt the GUI 101 to present statistics in relation to the usage of accessories as depicted in FIGS. 2A, 2B, and 3. Selecting button 106 can cause the AMS application to adapt the GUI 101 to present promotional offers and software updates.

It should be noted that the steps of method 400 in whole or in part can be repeated until a desirable pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 5 depicts a method 500 in which the AMS application can be programmed to recognize unknown accessories so that method 400 can be applied to them as well. Method 500 can begin with step 502 in which the AMS application detects an unknown accessory such as a new keyboard, gaming goggles, or gaming accessory from an unknown vendor by way of a communicative coupling to a computing device from which the AMS application operates. The AMS application in this instance can receive an identity from the keyboard or the operating system which is not known the AMS application. Upon detecting an unknown accessory, the AMS application in step 504 can present a depiction of an accessory of similar or same category in response to a user providing direction as to the type of accessory (by selecting for example a drop-down menu). Alternatively, or in combination with the user instructions, the AMS application can determine from the information received from the unknown accessory an accessory type.

In step 506 the AMS application can receive instructions describing all or a portion of the input functions of the unknown accessory. These instructions can come from a user who defines each input function individually or responds to inquiries provided by the AMS application. The AMS application can for example make an assumption as to a keyboard layout and highlight each key with a proposed function which the user can verify or modify. Once the AMS application has been provided instructions in step 506, the AMS application can create an accessory identity in step 508 which can be defined by the user. In steps 510 and 512, the AMS application can associate and record the accessory instructions with the identity for future recognition of the accessory. In step 514, the AMS application can present a depiction of the new accessory with its identity along with the other selectable accessories in section 117.

Method 500 can provide a means for universal detection and identification of any accessory which can be used to control or manage software applications operating in a computing device.

FIG. 6 depicts a method 600 for illustrating the AMS application responding to input function stimuli (triggers) of accessories. Method 600 can begin with step 602 in which the AMS application monitors the use of accessories. This step can represent monitoring the stimulation of input functions of one or more accessories communicatively coupled to a computing device from which the AMS application operates. The computing device can be a remote server or a local device near the accessories. The input functions can correspond to button depressions on a keyboard, gaming pad, or navigation device such as a mouse. The input functions can also represent navigation instructions such as mouse or joystick movements. The input functions can further represent speech supplied by a microphone singly or in combination with a headset. The input functions can also represent button depression at gaming goggles or a gaming accessory. Other existing or future input functions of an accessory detectable by the AMS application are contemplated by the present disclosure. The AMS application can monitor input functions by for example processing human interface device (HID) reports supplied by the accessories to the computing device.

Once one or more stimulations have been detected in step 604, the AMS application can proceed to step 606 to determine if action(s) have been associated with the detected stimulation(s). If for example the stimulations detected correspond to keyboard and mouse button depressions, the AMS application can determine if actions have been associated and recorded for such stimulations. If these stimulations "trigger" one or more actions, the AMS application can proceed to step 608 where it retrieves the stimulation definition of these actions for each accessory reporting a stimulation event. In step 610, the AMS application can substitute the detected stimulations with the stimulations defined by the action.

To illustrate this substitution, suppose for example that the detected stimulation was "Ctrl A" simultaneously depressed on a keyboard. Suppose further that an action associated with this stimulus consists of a macro that combines mouse clicks with a navigation of the mouse (e.g., moving the mouse quickly in a forward motion for a given distance), and a request to invoke an instant messaging (IM) session with a particular individual using Skype™ or some other common IM tool. In step 610, the AMS application would substitute "Ctrl A" for stimulations consisting of the mouse clicks, navigation and a request for an IM application. The substitute stimulations would then be reported in step 612 to an operating system (OS). As another example, suppose that the detected stimulation was a "C" button 188 depressed on an input interface of the gaming goggles 109. Suppose further that an action associated with this stimulus consists of a macro that combines a function to display a mapping indicator showing location of a teammate player on a viewing apparatus 190 of the gaming goggles 109 and a function to activate a gaming accessory 113. In step 610, the AMS application would substitute the "C" button 188 for stimulations to perform the substituted functions and report these stimulations to the +.

In step 616, the OS can determine whether to pass the substitute stimulations to an active software application in operation (e.g., a gaming application) and/or to invoke another software application. The active software application can be operating from the same computer system from which the OS and the AMS application operate or can be operating at a remote system such as an on-line server or family of servers (e.g., World of Warcraft) awaiting stimulation data from the computer system. In this illustration, the macro comprises both stimulation feedback for the active software application and a request to initiate an IM session. Accordingly, in the first example, the OS conveys in step 618 the mouse stimulation signals to the active software application (e.g., gaming application), and in a near simultaneous fashion invokes the IM session in step 620 with a specific individual (or organization). In the second example, the OS conveys in step 618 the stimulation signals to the active software application for the game to cause display of the teammate map on the viewing apparatus 190 of the pair of gaming goggles 109 and to activate the gaming accessory 113.

Referring back to step 606, the illustrations above cover a scenario in which the AMS application has detected an association of actions to accessory stimuli. If however the AMS application does not detect such an association, then the detected stimulus (or stimuli) supplied by one or more accessories is transmitted to the OS in step 614. For example, it may be that a stimulation based on the depressions of "Ctrl A" has no particular association to an action. In this case, the AMS application passes this stimulation to the OS with no substitutes. In step 616 the OS can determine if this stimulation invokes a new software application in step 620 or is conveyed to the previously initiated software application.

Contemporaneous to the embodiments described above, the AMS application can also record in step 622 statistics relating to the detected accessory stimulations. A portion of the AMS application can operate as a background process which performs statistical analysis on the stimulations detected. By selecting button 104 in FIG. 1A, the AMS application can provide an updated GUI which illustrates the usage of input functions of one or more accessories for which stimulations were detected in step 604. A keyboard accessory is shown in FIG. 2A. In this illustration, certain keys (references 205, 206 208, 210) on the keyboard are color-coded to illustrate the frequency of usage of these keys. A color scale 203 defines the frequency of usage of the input functions of the keyboard. The first end of the scale (navy blue) represents a single detected depression, while an opposite end of the scale (bright red) represents 500 detected depressions. Based on this scale, the AMS application maps by color in step 624 stimulations of the keyboard. For example, the key grouping 208 depict a color coding with the highest detectable usage, while the F7 key (reference 210) indicates the fewest depressions. Keys having zero depressions are not color coded to readily identify the color mapping of keys which were used at least once. In FIG. 2B, gaming goggles 109 is shown. Buttons 220, 225, 228, and 229 on the gaming goggles are color-coded to illustrate the frequency of usage of these buttons. In this example, the "C" button 228 is depicted by a color coding showing the highest detectable usage, while the "A" button 220 indicates the fewest depressions. Keys having zero depressions, such as the "B" button 225, are not color coded to readily identify the color mapping of keys which were used at least once.

The AMS application provides additional functions in a playback panel of the GUI which can help a user understand how the color coded keys were used during an active software application such as a video game. In this section of the GUI, the AMS application can present the user with a playback control function 202 which the user can select to replay, pause, forward or rewind the usage of these keys. When usage playback is selected, the user can for instance see the color coded keys highlighted in real-time with a temporary white border to visualize how the keys were selected. A time clock 204 provides the user the elapsed time of the playback sequence. Button 212 allows the user to retrieve statistics from other sessions, while button 214 provides the user a means to save statistics from a given session.

The GUI of FIGS. 2A and 2B could have been shown as a split screen with all accessories which generated one or more detected stimulations (e.g., keyboard, mouse, and microphone), each providing statistical symbolic results as described above for the keyboard. Although not shown, split screen embodiments are contemplated by the present disclosure for the GUI of FIGS. 2A and 2B.

In addition to a symbolic representation as shown in FIGS. 2A and 2B, the AMS application can provide the user a means to visualize raw statistics in a table format such as shown in FIG. 3 by selecting button 212. The table format shows raw data in section 302 and possible suggestions in section 304 for improving user performance which can be generated by the AMS application in step 626. Section 302 can be presented in a table format with a column identifying the key being analyzed, its usage, and number of key presses. The user can ascertain from this table the most and least frequently used keys as well as other identifiable patterns.

The AMS application can utilize an understanding of the layout of the accessory (in this case, the keyboard) to determine from the statistics ways that the user can improve response time or ergonomic use. For example, the AMS application can determine from a layout analysis that the key combination <Alt.> can be reassigned to a macro based on the trigger <Ctrl F> which could provide the user a faster response time and free up the user's right hand for other tasks. The AMS application can also provide alternative suggestions. For example, the AMS application can also suggest creating single button macros for each of the key combinations <Alt.> and <Ctrl A> which can be assigned to keys on the keyboard or left and right buttons of a mouse. The latter suggestion of assigning macros to the mouse can help the user free up his/her left hand.

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), type of operations commonly used to control the software (e.g., known actions as shown in the actions column 130 of FIGS. 1A and 1B), an understanding of the associations made by other users (e.g., gamers) to improve their performance when controlling the software, and so on. The AMS application can also be operable to communicate with the active software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance.

From these illustrations, it would be apparent to an artisan of ordinary skill in the art that innumerable algorithms can be developed to analyze accessory usage and thereby suggest improvements. These undisclosed embodiments are contemplated by the present disclosure.

Figure 7:
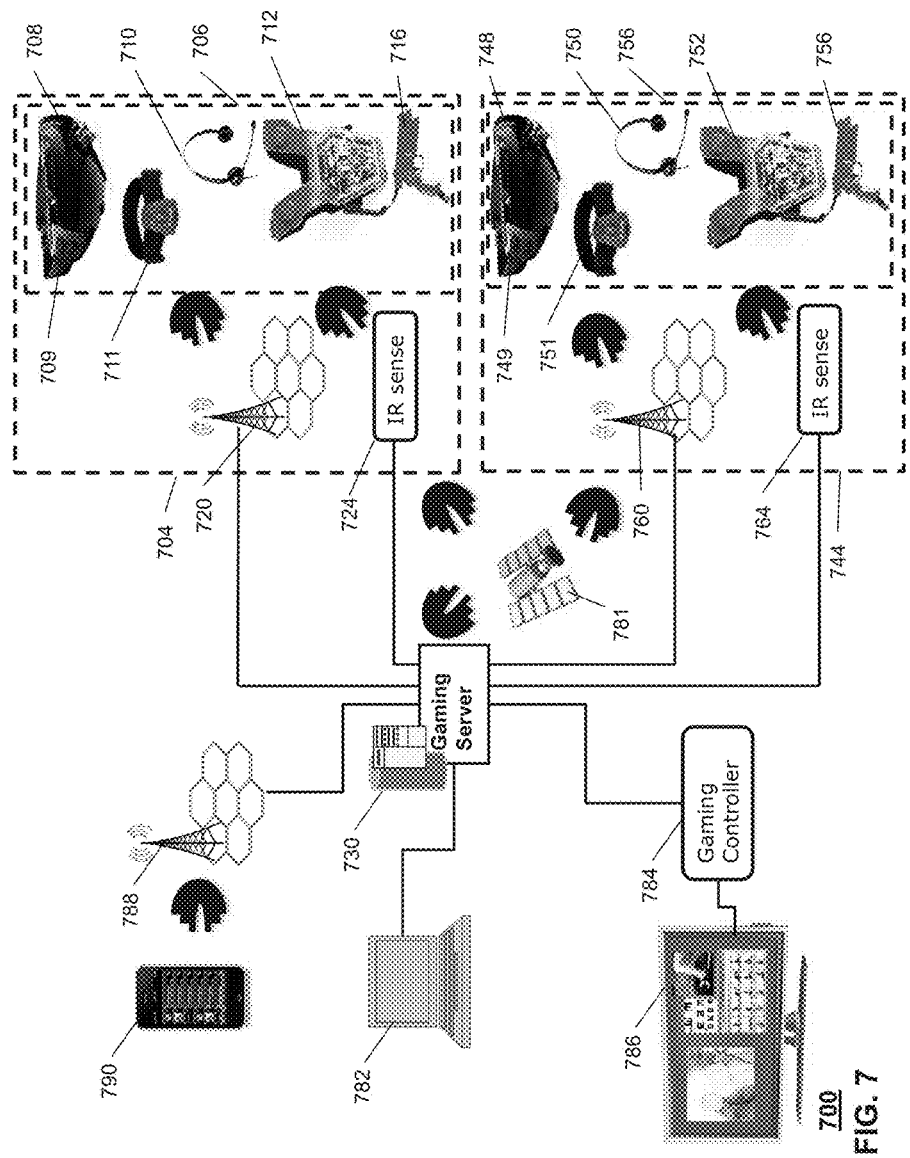
FIG. 7 depicts an illustrative embodiment of a virtual gaming system.

FIG. 7 depicts an illustrative embodiment of a system 700 for adapting a virtual game to a real-world location. System 700 can include a gaming server 730. The gaming server 730 can be in communication with computing devices 782, such as a laptop computer, a desktop computer, or a tablet. The gaming server 730 can also be in communication with mobile devices 790, such as a mobile phone or a personal assistant. The mobile devices 790 can be communicatively coupled to the gaming server 730 by way of a mobility network 788 coupled to the Internet or other communication means. The gaming server 730 can further be in communication with gaming controllers 784, such as a game console, that is further coupled to a display 786. The computing devices 782 and gaming controllers 784 can also be communicatively coupled to the gaming server 730 by way of the Internet or other communication means.

The gaming server 730 can be in communication with physical locations 704 and 744. The physical locations 704 and 744 can be equipped as virtual gaming spaces. For example, each physical location 704 and 744 can have mobility networks 720 and 760 capable of communicating wirelessly with gaming devices 706 and 756 used in the respective physical locations 704 and 744. The physical locations 704 and 744 can be at disparate locations (e.g., first gaming center in New York, second gaming center in Chicago). The gaming devices 706 and 756 at the physical locations 704 and 744 can include gaming goggles 708 and 748 with keypad buttons 709 and 749, Global Positioning Satellite (GPS) sensing devices 711 and 751, headsets with microphones 710 and 750, gaming vests 712 and 752, and gaming accessories 716 and 756. Any or all of the gaming devices 706 and 756 of the first and second physical locations 704 and 744 can communicate with the gaming server 730 via the first and second mobility networks 720 and 760. The gaming devices 706 and 756 of the first and second physical locations 704 and 744 can also communicate with the gaming server 730 via infrared sensing devices 724 and 764. The gaming server 730 can further communicate with the gaming devices 706 and 756 at the first and second physical locations 704 and 744 via satellite 781. The gaming server 730 can communicate with any number of other physical locations and/or with multiple gaming accessories for multiple players at each physical location.

The gaming server 730 can acquire the boundary and topological information from a database or can acquire the information by collecting GPS information from locations in the first and second physical location 704 and 744 over the first and second mobility networks 720 and 760. The gaming accessories at each physical location 704 and 744 can be worn and/or used by players to allow the gaming server 730 to track player movements and player actions. For example, the gaming server 730 can track movements of players at the first and second physical locations 704 and 744 who are wearing GPS sensing devices 711 and 751. As the players move around the locations 704 and 744, the GPS sensing devices 711 and 751 can detect changes in player positions relative to the boundary and topological information of the physical locations 704 and 744 as identified by the gaming server 730. As another example, the gaming goggles 708 and 748 can include GPS sensing apparatus to allow the goggles to acquire the current positions of the players as the players move about the physical locations 704 and 744. The GPS sensing devices 711 and 751 and goggles 708 and 748 can include wireless communication capabilities, such as wireless cellular or infrared.

The gaming devices 706 and 756 can also include other sensory devices such as gyroscopes, compasses, accelerometers, level detectors, diode arrays, infrared detectors and/or antennas, which can provide the gaming server 730 orientation, altitude, and location coordinates, as well as velocity, acceleration and/or trajectory information. The gaming devices 706 and 756 can use these sensory devices to detect and report positioning and orientation information to the gaming server 730. For example, the gaming goggles 708 and 748 can use any or several of these sensory devices to determine orientation of a wearing player's head. By determining the player's head orientation, the gaming goggles 708 and 748 can allow the gaming server 730 to determine the physical and virtual field of view of the player.

The foregoing embodiments are a subset of possible embodiments contemplated by the present disclosure. Other suitable modifications can be applied to the present disclosure.

Figure 8:
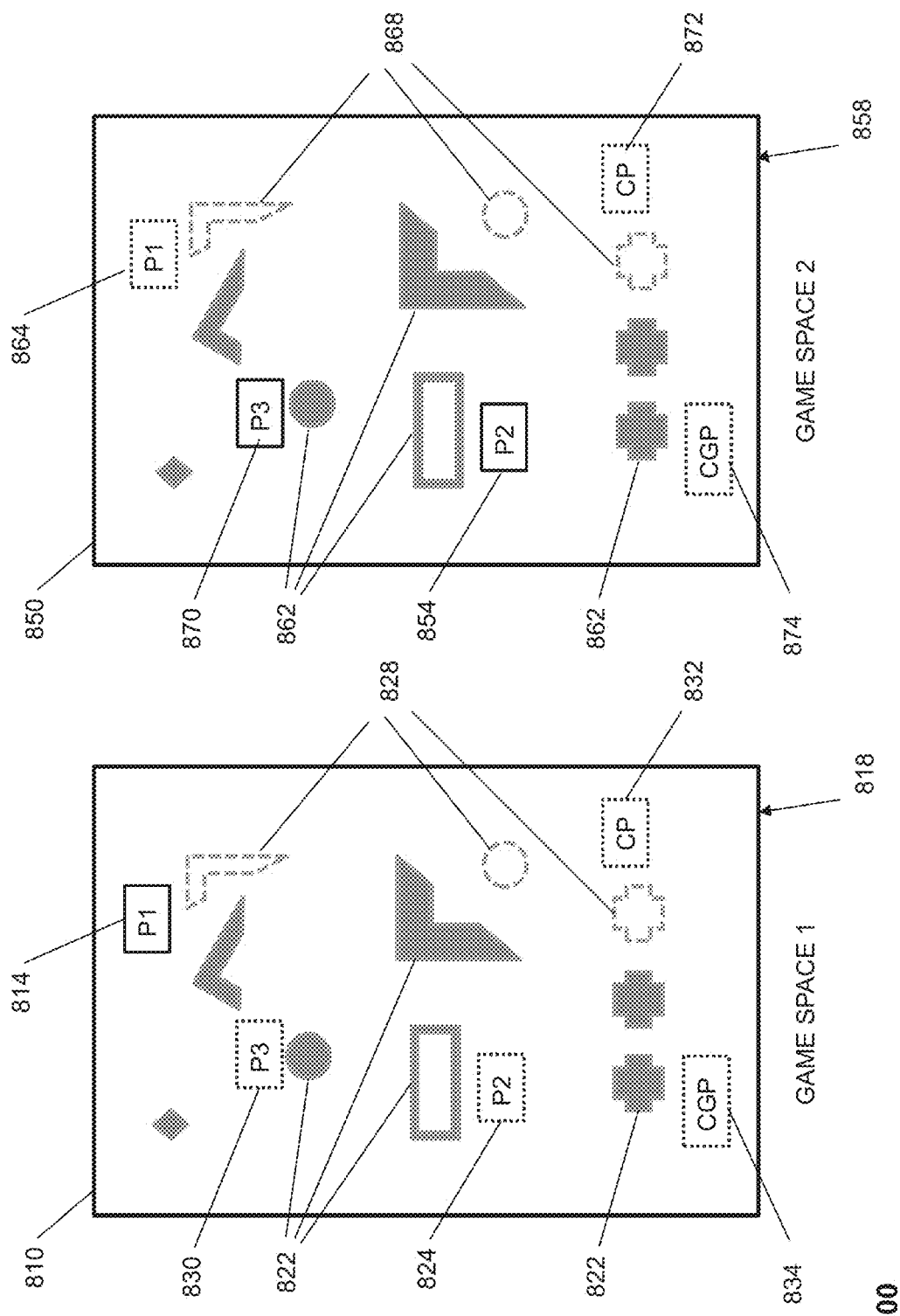
FIGS. 8-9 depict illustrative embodiments of virtual gaming spaces.

FIG. 8 depicts a virtual gaming space 800 for playing a virtual reality game at two real world locations. The simplified schematic illustrated top view of two physical locations 810 and 850 that can be used as two gaming spaces for playing games featuring virtual gaming content. Each physical location 810 and 850 can include boundaries 818 and 858 and topographical features, including physical structures and objects 822 and 862 selectively placed within the boundaries. Preferably, the boundaries 818 and 858 and/or the topographical features 822 and 862 of the two physical locations 810 and 850 are identical, or nearly identical, such that two identical gaming spaces can be created. The physical objects and structures 822 and 862 of the two gaming spaces 810 and 850 can be selectively altered to include certain objects and structures 822 and 862 while excluding other structures. The gaming server 730 can control activation or deactivation of physical objects and structures 822 and 862 either directly or through a sub-server operating at the physical location. In one example, active structures and objects 822 and 862 are raised up to or lowered onto playing surfaces of each gaming space 810 and 850, while inactive structures and objects are lowered below or raised above the player surfaces. Accordingly, players can request at disparate locations an obstacle configuration matched at each location to engage in a real-world game while at the same time experiencing a virtual presence of each player at each location as will be described below.

The gaming server 730 can verify that the resulting first and second physical locations 810 and 860 are configured identically, or nearly identically, so a player at the first gaming space will experience exactly the same boundary and topographic limitations as a player at the second gaming space. Because the first and second gaming spaces 810 and 850 are of the same size and physical configuration, the gaming server 730 can map the boundary and topographical data that describes the two locations into a single gaming space, which is defined as the virtual gaming space that is common to both the first physical location 810 and the second physical location 860.

A first player 814 can physically enter the first gaming space 810. The gaming server 730 can recognize the presence and location of the first player 814 by, for example, communicating with gaming devices 706 and 756 worn or carried by the first player 814. For example, the first player 814 can wear gaming goggles 708 that include two-way communication capabilities between the goggles 708 and the gaming server 730. The communications may be directly between the gaming server 730 and goggles 708 or may be via another server device coupled directly to the first gaming space 810 and in communication with the gaming server 730. The gaming server 730 can identify the presence and location of the first player 814 through other means, such as wireless or infrared communications with the gaming goggles 708, a GPS sensing device 711 that may be a stand-alone device or that may be integrated into another gaming device, a headset device 710, a gaming vest 712, or a gaming accessory 716, such as a gun. The gaming server 730 can collect information based on other sensory devices, such as gyroscopes, compasses, accelerometers, level detectors, diode arrays, infrared detectors and/or antennas, to detect position and orientation information for the first player 814 as this player moves about in the first gaming space 810. Similarly, the gaming server 730 can identify presence, position, and orientation information for a second player 854 who has entered the second gaming space 850 using similar sensors of the second player 854.

The gaming server 730 can further map the position and orientation information for the first player 814, who is physically at the first physical location 810, onto the boundary and topographical information for the first physical location 810. The gaming server 730 can also map the first player's position and orientation information on to a virtual gaming space. Similarly, the gaming server 730 can map the position and orientation information for the second player, who is physically located at the second physical location 850, onto the virtual gaming space. By mapping the second player 824 onto the virtual gaming space, the first and second players 814, 824 can be present, virtually, in the virtual gaming space. Further, the first gaming goggles 708 worn by the first player 814 can be capable of superimposing video and still images onto a transparent viewing apparatus. The gaming server 730 can provide to the first gaming goggles 708 a virtual video or still image of the second player 824 or information that can be used to produce such a video or still image. When the first player 814 looks though the gaming goggles 708, the first player 814 sees the second player 824 virtually present at his first gaming location 810. Similarly, the gaming server 730 can provide a video or still image of the first player 814 to the gaming goggles 748 worn by the second player 854. In this way, the first server 730 can allow the first player 814 and the second player 854 to see their counterpart as a virtual player in their respective physical gaming space, 810 and 850, even if the two players are physically separated by great distances.

The gaming server 730 can also identify the other players physically present at the first or second gaming spaces 810 and 850. For example, a third player 870 can be physically present at the second gaming space 850. The third player 870 can be allied with either, or both, of the first and second players 814 and 824 in a virtual game or with neither of them. The gaming server 730 can track the position and orientation for the third player 870. For example, if the third player 870 is physically present at the first gaming space 850, then the gaming server 730 can map the physical position and orientation information for the third player 870 to the virtual gaming space. Information for a virtual third player 830 can be generated and sent to the gaming goggles 708 of the first player 814. The virtual third player 830 can be superimposed onto the transparent viewing apparatus of the gaming goggles 708 and 748 so that the first player 814 can see the virtual third player 830 in his field of view.

The gaming server 730 can detect a computer player that is attempting to join a virtual game at the virtual gaming space formed by mapping the first and second gaming spaces 810 and 850. A computer player 832 is a player that is controlled by a user at a computer device 782, mobile device 790, or gaming controller 784. The computer player 832 does not exist as a physical player and so is only available on the virtual gaming space as a virtual computer player 832 at the first game space 810 and the computer player 872 at the second game space 850. The virtual computer player 832 and 872 can be visible to the first and second players 814 and 854 through their gaming goggles 708 and 748 according to information supplied by the gaming server 730. The information supplied by the gaming server 730 can include an avatar representative of the computer player 872, and coordinate and orientation information to describe the movements, orientation and positioning of the computer player 832. The gaming server 730 can also detect a computer-generated player. The computer-generated is controlled by the virtual game running at computer device 782, mobile device 790, gaming controller 784, or the gaming server 730 and does not exist as a physical player. The computer-generated player is only available on the virtual gaming space as a virtual computer player. The virtual computer-generated player 834 and 874 can be visible to the first and second players 814 and 854 through their gaming goggles 708 and 748 according to information describing the computer-generated player. The information supplied by the gaming server 730 can include an avatar representative of the computer-generated player, and coordinate and orientation information to describe the movements, orientation and positioning of the computer-generated player.

Figure 9:
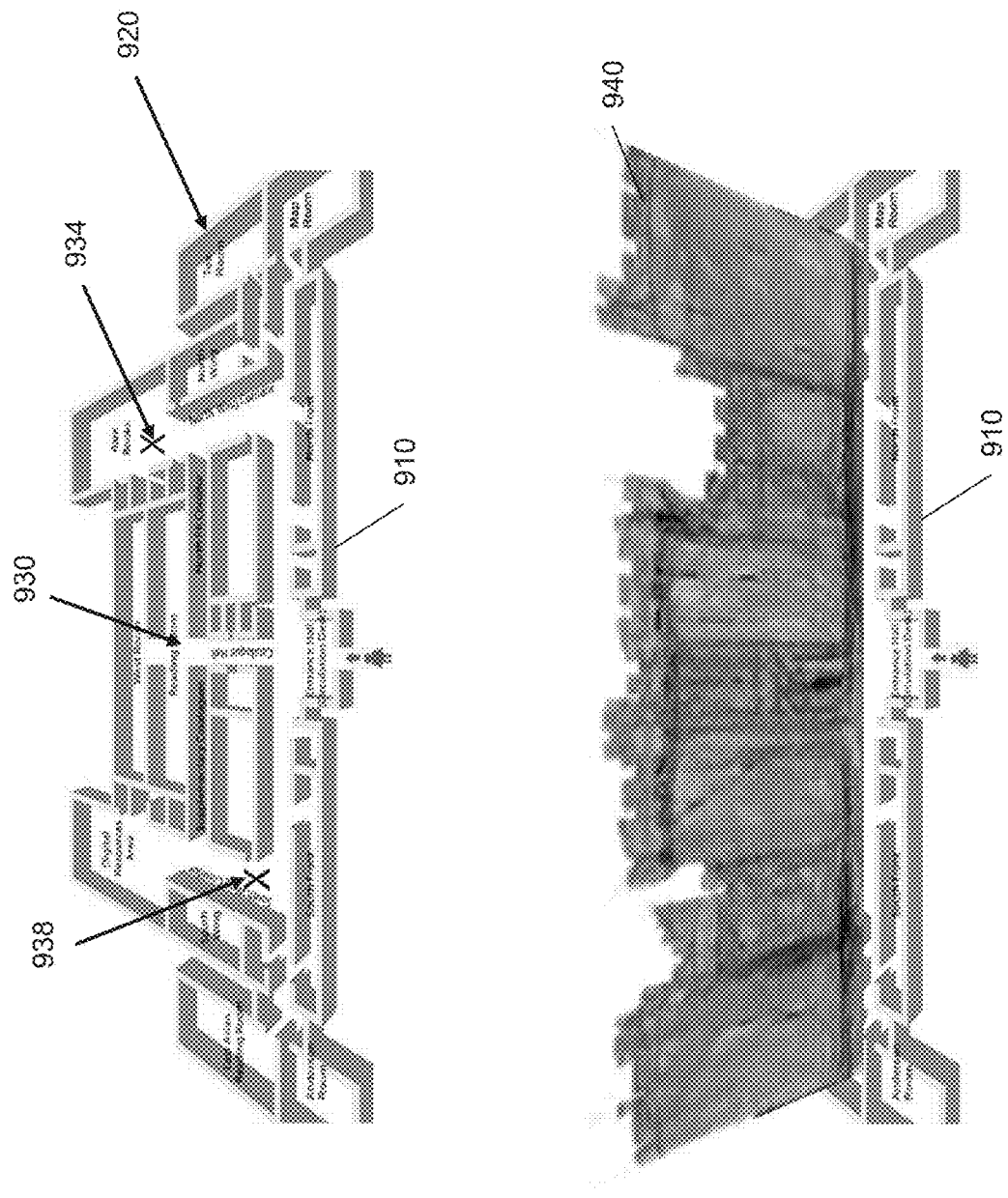

FIG. 9 depicts a virtual gaming space 900 for playing a virtual reality game at real-world space. The simplified schematic illustrates a gaming space 910 that is a physical location. The gaming space 910 can be a building, an outdoors location, a park, or another structure. For example, the gaming space 910 can be a physical library (e.g., at a college) with multiple rooms. The gaming server 730 can identify boundaries 920 of the gaming space. The gaming server 730 can further identify topographical features 930, such as the location walls, rooms, stairways, and large objects, within the physical space 910. For example, the gaming server 730 can consult a database holding boundary and topographical feature information for well-known locations, such as airports, malls, theme parks, museums, libraries, and parks. The gaming server 730 can map the boundary and orientation information of the physical gaming space 910 to a virtual structure 940 based on a more visually interesting space. For example a physical library building 910 can be mapped to a virtual castle 940 as shown. Other virtual gaming spaces 940 can be mountains, caves, underwater worlds, and the like.

The gaming server 730 can detect the presence of one or more players 934 and 938 in the gaming location, who indicate a desire to play a virtual reality game in a virtual gaming space based on the physical space 910. The players 934 and 938 can be using computer devices 782, mobile devices 790, or gaming controllers 784 to access the virtual reality game. For example, one or more people can be accessing mobile devices 790 while at a library. The one or more people enter a virtual reality gaming application hosted, for example, by the gaming server 730 at the library. The gaming server 730 maps the airport terminal boundaries and topography to a virtual structure corresponding to an ancient castle 940, as shown. The gaming server 730 sends video or still images of the virtual structure 940 to the mobile devices 790 of the first and second players 934 and 938.

The gaming server 730 can also track the position and orientation of the first and second players 934 and 938. For example, the gaming server 730 can track GPS coordinates based on GPS sensing devices 711 and 751 of the players. The mobile devices 790 can be used to track player movements where these devices are capable of GPS detection and reporting. In another example, the players 934 and 938 do not physically move about at the physical location 910. Rather, the players move only in the virtual structure 940 as displayed on their mobile devices 790. In another example, a series of Wireless Fidelity (Wi-Fi) hotspots are distributed throughout the physical location 910. As the players 934 and 938 move about in the physical location, their mobile devices 790 can experience changing wireless signal strengths from the various Wi-Fi hotspots. For example, as the first player 934 carries a mobile device 790 closer to a one Wi-Fi hotspot, the signal strength of that hotspot can increase at the mobile device 790. In turn, signal strength between the same mobile device 790 and a different Wi-Fi hotspot can be decreasing. The gaming server 730 can capture data from the mobile devices 790 corresponding to the changing relative signal strengths of the different Wi-Fi hotspots. The gaming server 730 can interpolate the relative signal strengths and utilizing triangulation techniques based on the known locations of the hot spots to determine positioning of the mobile devices 790 throughout the physical location 910.

Figure 10:
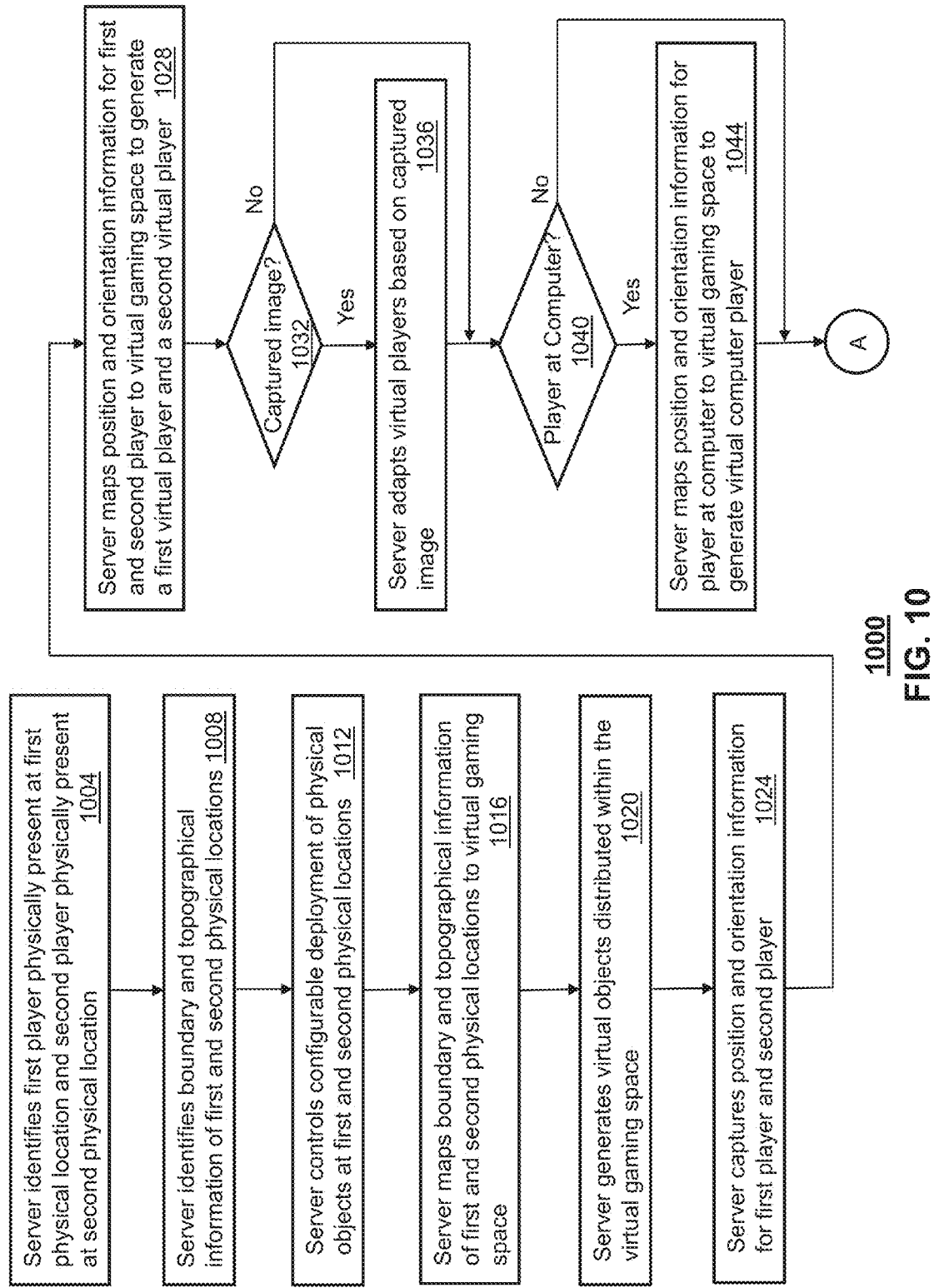
FIGS. 10-12 depict illustrative embodiments of methods operating in portions of the systems described in FIGS. 1-9.
Figure 11:
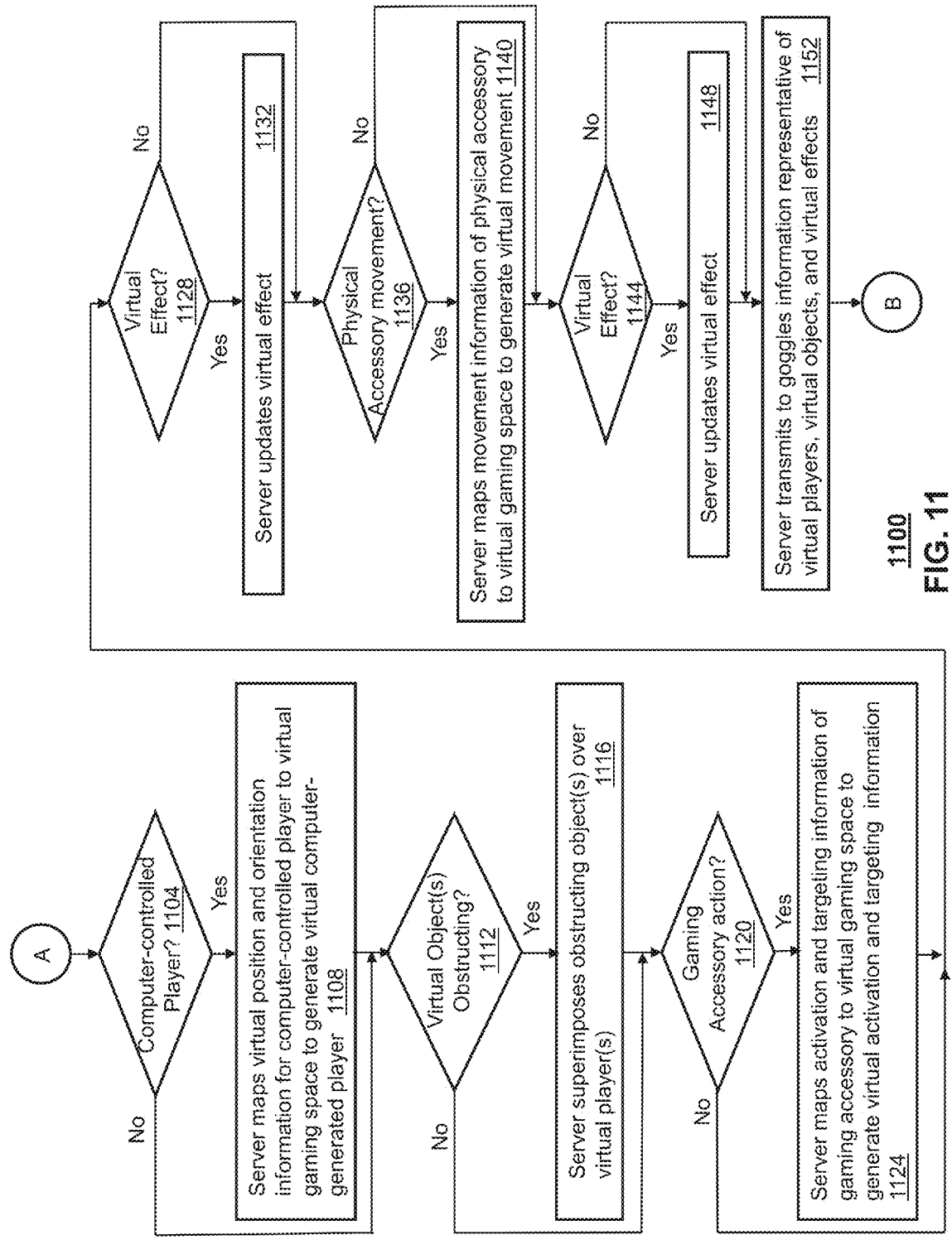
Figure 12:
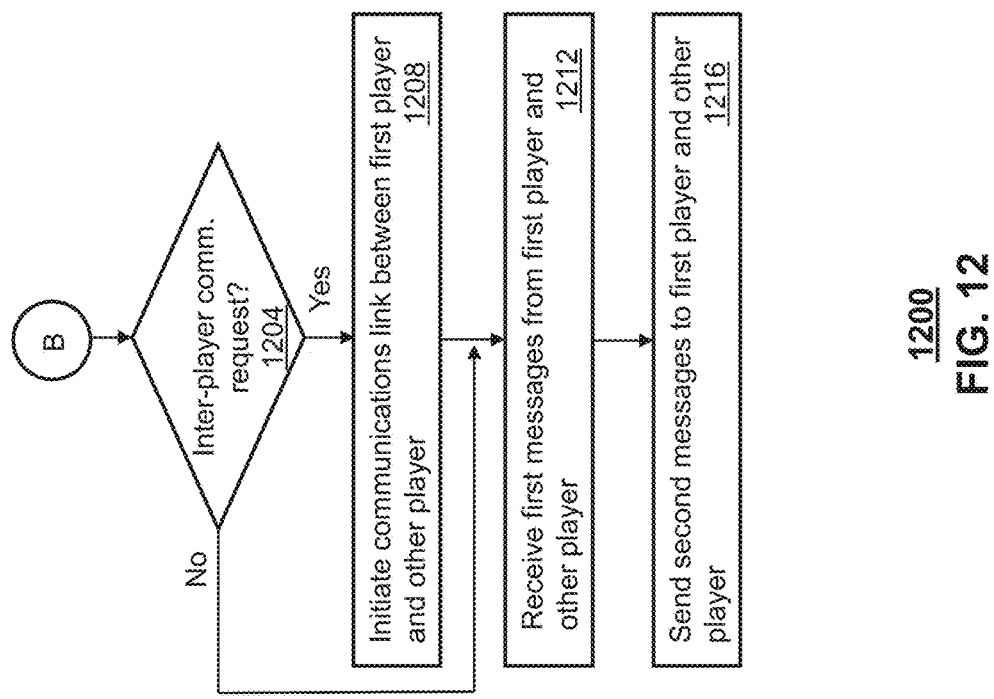

FIGS. 10-12 depict an illustrative method 1000-1200 that operates in portion of the devices and systems of FIGS. 1-7, and FIG. 8. Method 1000-1200 can begin with step 1004 in which a gaming server 730 can identify a first player 814 physically present at a first physical location 810 and a second player 854 physically present at a second physical location 850. The first and second physical locations 810 and 850 can comprise disparate locations. The first and second locations 810 and 850 can be outdoor facilities, such as park, or indoor facilities, such as warehouses, where substantial gaming spaces can be defined. The first and second locations 810 and 850 can be near one another or can be in different cities, states, or countries.

In step 1008, the gaming server 730 can identify boundary information 818 and topographical information 822 for the first physical location 810 and second boundary information 858 and topographical information 862 for the second physical location 850. In one example, the gaming server 730 can acquire the boundary and topological information 818 from a database. In another example, the gaming server 730 can acquire the boundary information 818 and topographical information 822 by collecting GPS information from the first and second physical location 704 and 744 over the first and second mobility networks 720 and 760.

In step 1012, the server can control configurable deployment of physical objects 822 and 862 at the first and second physical locations 810 and 850. The physical objects and structures 822 and 862 of the first and second locations 810 and 850 can be selectively added or removed. In one example, the gaming server 730 can control placement or removal of physical objects and structures either directly or through a sub-server operating at the physical location. In one example, active structures and objects 822 and 862 can be raised above or lowered onto playing surfaces of the first and second locations 810 and 850. This approach can be well-suited to spaces located inside of buildings. In a first configuration, for example, first structures and objects 822 are lowered into placed onto the first gaming space 810, while second structures and objects are lifted and removed from the gaming space 810. To maintain consistency between the first and second locations 810 and 850, the setup of objects and structures must be the same for the first and second locations 810 and 850. In one example, the unused objects and structures are lowered and stored below the playing surface.

In step 1016, the gaming server 730 can map the first boundary and topographical information of the first physical location 810 and the second boundary and topographical information of the second physical location 850 to a virtual gaming space. Because the first and second gaming spaces 810 and 850 are of the same size and physical configuration, the gaming server 730 can map the boundary and topographical data that describes the each of the locations 810 and 850 into a single gaming space. The gaming server 730 defines this single gaming space as a virtual gaming space. When a game is played by the first and second players 814 and 854, and another of the other participants, all of the virtual aspects of the game are referenced from the virtual gaming space. If a computer player 832 and 872 joins the game, then the location of a virtual computer player, who represents the computer player for purposes of the game, is references to the virtual gaming space. In this way, a single virtual game can be played involving multiple physical players at multiple physical locations and including a multiple computer players and computer-controlled players. All of the computer devices 782, mobile devices 790, gaming controller 784, and player game devices 706, 756 for all of the participating players can be referenced to a common, virtual gaming space.

In step 1020, the gaming server 730 can generate virtual objects 828 and 868 distributed within the virtual gaming space. The gaming server 730 can generate a wide-variety of backgrounds and images of objects within the virtual gaming space that can be seen by the players via the gaming goggles 708 and 748.

In step 1024, the gaming server 730 can capture first position and orientation information for the first player 814 at the first physical location 810 and the second position and orientation information for the second player 854 at the second physical location 850. The gaming server 730 can recognize the presence and location of the first player 814 by, for example, communicating with gaming devices 706 and 756 worn or carried by the first player 814. For example, the first player 814 can where a pair of gaming goggles 708 that include two-way communication capabilities between the goggles 708 and the gaming server 730. The communications may be directly between the gaming server 730 and goggles 708 or may be via another server device coupled directly to the first gaming space 810 and in communication with the gaming server 730. The gaming server 730 can identify the presence and location of the first player 814 through other means, such as wireless or infrared communications with the gaming goggles 708, a GPS sensing device 711 that may be a stand-alone device or that may be integrated into another gaming device, a headset device 710, a gaming vest 712, or a gaming accessory 716, such as a gun. The gaming server 730 can further collect information based on other sensory devices, such as gyroscopes, compasses, accelerometers, level detectors, diode arrays, infrared detectors and/or antennas, to detect position and orientation information for the first player 814 as this player moves about in the first gaming space 810. Similarly, the gaming server 730 can identify presence, position, and orientation information for a second player 854 who has entered the second gaming space 850.

In step 1028, the gaming server 730 can map the first position and orientation information for the first player and the second position and orientation information for the second player to the virtual gaming space to generate a first virtual player corresponding to the first player and a second virtual player corresponding to the second player. Since the first physical location 810 can be mapped to a virtual gaming space, the gaming server 730 can map the first player's position and orientation information on to the virtual gaming space. Similarly, the gaming server 730 can map the position and orientation information for the second player, who is physically located at the second physical location 850, onto the virtual gaming space. By mapping the second player 824 onto the virtual gaming space, the second player 824 can also be present, virtually, in the virtual gaming space.

In step 1032, the gaming server 730 can capture an image of the first or second player 814 and 854. If the image is captured and available for use, then gaming server 730 can adapt this image to generate a virtual player 864 and 824 in step 1036. In one example, the gaming server 730 can adapt movements of the virtual player 864 and 824 to mimic movements of the physical player 814 and 854 represented by the virtual player.

In step 1040, the gaming server 730 can identify another player playing at a computer device 782, mobile device 790, or gaming controller 784. If a computer player is identified, then, in step 1044, the gaming server 730 can map position and orientation from the computer player to the virtual gaming space to generate a virtual computer player 832 and 872.

In step 1104, the gaming server 730 can identify a computer-controlled player that is being commanded by a software application at a computer device 782, mobile device 790, or gaming controller 784. If a computer-controlled player is identified, then, in step 1108, the gaming server 730 can map position and orientation from the computer-controlled player to the virtual gaming space to generate a virtual computer-controlled player 834 and 874.

In step 1112, the gaming server 730 can detect any virtual objects 828 and 868 that would virtually obstruct at least a part of a view of one of the virtual players a perspective of another of the virtual players. If such a virtual object 828 and 868 obstruction is detected, then, in step 1116, the gaming server 730 superimposes the identified part of the obstructing virtual object 828 and 868 at a display of the goggles 708 and/or 748 if the virtual object is in a line of site of the players wearing these goggles, thereby causing a visual obstruction as if the object were in the location of the player(s).

In step 1120, the gaming server 730 can capture activation and targeting information for a gaming accessory 716 of a player physically present at the first location 810. If activation is captured, then, in step 1124, the gaming server 730 can map the activation and targeting information of the gaming accessory 716 to the virtual gaming space to generate virtual activation and targeting information. If the gaming server 730 determines a virtual effect from the virtual activation and targeting of the gaming accessory, in step 1128, then the gaming server 730 can update the virtual effect in step 1132. For example, in the case of a user targeting an opposing player a determination can be made by the gaming server 730 as to whether the opposing player was virtually hit. The gaming server 730 or the gaming accessory 716 can then transmitting a message to the opposing player's goggles or gaming accessory indicating that the virtual hit.

In step 1136, the gaming server 730 can capture movement information for a physical accessory of a player 814 physically present at a physical location 810. If movement information for the physical accessory is captured, then, in step 1140, the gaming server 730 can map the captured movement information of the physical accessory to the virtual gaming space to generate a virtual movement for the physical accessory. For example, the first player 814 can carry a physical accessory, such a as shield. If the first player 814 moves the physical shield to conceal himself from the view of the second player 854, in the virtual gaming space, then the gaming server 730 can detect the movement and position of the shield and map this movement and position to virtual gaming space such that the virtual first player is shield from the view of the second player (as seen through the gaming goggles 748 of the second player 854 according to information supplied by the gaming server 730 to the gaming goggles 748). In step 144, the gaming server 730 can determine a virtual effect, if any, from the virtual movement of the physical accessory and the gaming server 730 can update the virtual effect in step 1148.

In step 1152, the gaming server 730 can transmit to the goggles 708 of a physical player 814, such as first physical player 814 at a first physical location 810, information representative of a virtual player 824, such as the virtual player 824 representing the second player, who is physically present at the second location 850 but only virtually present a the first location 810. The first goggles 708 display the second virtual player 824 superimposed onto a transparent viewing apparatus for viewing of the virtual gaming space. The gaming server 730 also can transmit to the goggles 708 information representative of virtual objects and virtual effects (e.g., shots being fired at one of the players as seen by the goggles of the targeted player based on virtual effect information supplied by the gaming server 730 to the goggles of the targeted player). The gaming server 730 can transmit streaming video to the goggles 708 representing virtual objects, effects, and players.

In step 1204, the gaming server 730 can determine if it has received a request for communication between a first player and a second player. If a request is received in step 1204, then the gaming server 730 can initiate a communications link between a first player and a second player. In one example, communications between players can be initiated by a depressing button on the gaming goggles 708 or on the headset 710. The gaming server 730 can detect the request and establish the necessary communications link. In one example, the gaming server 730 can route communications between a headset 710 of a first player and a headset 750 or a mobile device 790 of a second player by using one or more mobility networks 720, 760, and 788. In step 1212, the gaming server 730 can receive messages from the first player and the other player. In step 1216, the gaming server 730 can send messages to the first player and the other players.

In one embodiment, the gaming location can be a single physical space where multiple players are present, as depicted in the physical location 910 of FIG. 9. The gaming server 730 can identify first and second players 934 and 938 physically present at the physical location 910, who indicate a desire to play a virtual reality game in a virtual gaming space based on the physical space 910. The players 934 and 938 can use computer devices 782, mobile devices 790, or gaming controllers 784 to access a virtual reality game based in the single physical location 910. A virtual reality gaming application can hosted at the physical location 910 by the gaming server 730 or by another computer device. The gaming server 730 can identify boundary and topographical information for the physical location 910 and can further identify topographical features 930, such as the location walls, rooms, stairways, and large objects, within the physical space 910. The gaming server 730 can then map the boundary and topographical information of the physical location 910 to a virtual gaming space 940.

The gaming server 730 can also generate a virtual structure 940 corresponding to a visually interesting, virtual gaming space. For example a physical library building 910 can be mapped to a virtual castle 940, as shown. The virtual gaming space 940 can be a geological feature, such as a mountain, cave, or underwater world. The gaming server 730 can send video or still images of the virtual structure 940 to the mobile devices 790 of the first and second players 934 and 938. In step 1320, the gaming server 730 can generate virtual objects within the virtual structure 940.

The gaming server 730 can capture and track position and orientation information for the first and second players 934 and 938 at the physical location 910. In another example, the virtual game can be structured such that the players 934 and 938 do not physically move about at the physical location 910. Rather, the players move only as virtual players within the virtual structure 940 as displayed on the players' computer devices 782 or mobile devices 790.

From the foregoing descriptions, it would be evident to an artisan with ordinary skill in the art that the aforementioned embodiments can be modified, reduced, or enhanced without departing from the scope and spirit of the claims described below. In one embodiment, the gaming server 730 can use a wireless devices distributed throughout a physical location to provide position information for players. The gaming server 730 can initiate several wireless communications links between a first player device, such as a mobile device, and wireless devices, such as a series of Wireless Fidelity (Wi-Fi) hotspots, in the virtual gaming space. The gaming server 730 can receive wireless signal strength readings from the mobile devices corresponding to the several wireless communications links established for the players' devices. As players move about in the physical location, their mobile devices can experience changing wireless signal strengths from the various Wi-Fi hotspots. The gaming server 730 can capture data from the mobile devices corresponding to the changing relative signal strengths of the different Wi-Fi communication links and can interpolate the relative signal strengths as against the known locations of the hot spots to determine positioning and orientation of the mobile devices.

In another embodiment, the gaming server 730 can consult a database holding boundary and topographical feature information for well-known locations, such as airports, malls, theme parks, museums, libraries, and parks. The gaming server 730 can use the database boundary and topographical feature information as a basis for generating a virtual gaming space.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal displays (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server device, comprising:
   a memory to store executable instructions; and
   a processing system including a processor coupled to the memory, wherein responsive to executing the executable instructions, the processing system performs operations comprising:
   receiving, from a first goggle device of a first player, a plurality of input stimulations associated with a virtual game application;
   determining a single input macro for generating a substitute stimulation from the plurality of input stimulations;
   capturing first position and first orientation information for the first player at a first physical location according to first global position system information and second position and second orientation information for a second player at a second physical location according to second global positioning system information, wherein the first physical location and the second physical location comprise remote locations;
   mapping the first position and the first orientation information for the first player and the second position and the second orientation information for the second player to a virtual gaming space of the virtual game application to generate a first virtual player corresponding to the first player and a second virtual player corresponding to the second player;
   transmitting, to a first goggle device of the first player, information representative of the second virtual player, wherein the first goggle device present the second virtual player superimposed onto a transparent viewing apparatus for viewing of the virtual gaming space;
   receiving a first input stimulation of the first goggle device;
   retrieving the substitute stimulation for the first input stimulation according to the single input macro associated with an accessory management profile; and
   transmitting the substitute stimulation to the virtual game application.

2. The server of claim 1, wherein the processing system further performs operations comprising:
   generating the second virtual player corresponding to the second player by way of adapting one captured image of the second player.

3. The server of claim 1, wherein the information representative of the second virtual player comprises streaming video of the second virtual player.

4. The server of claim 1, wherein the processing system further performs operations comprising:
   determining a virtual effect within the virtual game application according to the substitute stimulation that is transmitted to the virtual game application; and
   transmitting, to the first goggle device, information representative of the virtual effect.

5. The server of claim 1, wherein the processing system further performs operations comprising:
   capturing activation and targeting information for a first gaming accessory of the first player physically present at the first physical location;
   mapping the activation and targeting information for the first gaming accessory to the virtual gaming space to generate a virtual activation and targeting for the first gaming accessory;
   determining a virtual effect within the virtual game application according to the virtual activation and targeting of the first gaming accessory; and
   transmitting, to the first goggle device, information representative of the virtual effect.

6. The server of claim 5, wherein the activation and targeting information comprises sensory data derived from one of a gyroscope, a compass, an accelerometer, a level detector, a diode array, a global positioning system detector, an infrared detector, or an antenna.

7. The server of claim 5, wherein the processing system further performs operations comprising:
   receiving a second input stimulation of the first gaming accessory while monitoring the first gaming accessory in use;
   retrieving a substitute stimulation for the second input stimulation according to the accessory management profile; and
   transmitting the substitute stimulation to an operating system associated with the virtual game application.

8. The server of claim 1, wherein the processing system further performs operations comprising:
   capturing movement information for a physical accessory of the first player physically present at the first physical location;
   mapping the movement information for the physical accessory to the virtual gaming space to generate a virtual movement for the physical accessory;
   determining a virtual effect within the virtual game application of the virtual movement for the physical accessory; and
   transmitting, to the first goggle device, information representative of the virtual effect.

9. The server of claim 1, wherein the processing system further performs operations comprising controlling deployment of a plurality of first physical objects at the first physical location and a plurality of second physical objects at the second physical location according to a selectable configuration.

10. The server of claim 9, wherein the processing system further performs operations comprising:
    generating a plurality of virtual objects distributed within the virtual gaming space; and
    transmitting, to the first goggle device, information representative of the plurality of virtual objects, wherein the first goggle device displays the plurality of virtual objects superimposed onto the transparent viewing apparatus for viewing the virtual gaming space.

11. The server of claim 10, wherein the processing system further performs operations comprising:
    identifying a portion of the plurality of virtual objects that virtually obstructs a part of the second virtual player from first virtual player; and
    superimposing the portion of the plurality of virtual objects that is identified over the part of the second virtual player that is virtually obstructed.

12. The server of claim 1, wherein the processing system further performs operations comprising:
    identifying a computer player that is playing at a computing device communicatively coupled to the server;
    mapping second virtual position and second virtual orientation information for the computer player to the virtual gaming space to generate a third virtual player; and
    transmitting, to the first goggle device, information representative of the third virtual player, wherein the first goggle device displays the third virtual player superimposed onto the transparent viewing apparatus for viewing the virtual gaming space.

13. The server of claim 12, wherein the processing system further performs operations comprising:
receiving a second input stimulation of the computing device while monitoring the computing device in use;
retrieving a substitute stimulation for the second input stimulation according to the accessory management profile; and
transmitting the substituted stimulation to the virtual game application.

14. The server of claim 1, wherein the processing system further performs operations comprising:
receiving a request for communications between the first player and one other player;
responsive to the request, initiating a communications link between the first player and the one other player;
receiving first messages from the first player and the one other player; and
transmitting second messages to the first player and the one other player.

15. The server of claim 14, wherein the first messages are sent from the first player by way of one of the first goggle device or a first gaming accessory of the first player and wherein the second messages are received by the first player by way of one of the first goggle device or the first gaming accessory of the first player.

16. A goggle device, comprising:
a memory to store instructions; and
a processing system including a processor coupled to the memory, wherein responsive to executing the instructions, the processing system performs operations comprising:
transmitting a plurality of input stimulations associated with a virtual game application to a gaming server, wherein the gaming server determines a single input macro for generating a substitute stimulation from the plurality of input stimulations;
determining first position and first orientation information relative to first boundary and topographical information of a first physical location for a first player physically present at the first physical location according to a global positioning system;
receiving information, from the gaming server, representative of a virtual player at a virtual gaming space of the virtual game application corresponding to a mapping of second boundary and topographical information of a second physical location, wherein the virtual player corresponds to second position and second orientation information for a second player physically present at the second physical location;
presenting the virtual player superimposed onto a transparent viewing element for viewing of the virtual gaming space;
transmitting, to the gaming server, a first input stimulation associated with a first input at a user interface; and
receiving, from the gaming server, information representative of a virtual effect within the virtual game application according to the first input stimulation, wherein the gaming server retrieves a substitute stimulation for the first input stimulation according to the single input macro and provides the substitute stimulation to the virtual game application.

17. The goggle device of claim 16, wherein the processing system further performs operations comprising transmitting the first position and the first orientation information for the first player to the gaming server.

18. The goggle device of claim 16, wherein the first position and orientation information for the first player further comprises sensory data derived from one of an infrared detector, an antenna, or a combination thereof.

19. A method, comprising:
mapping, by a processing system comprising a processor, first position and first orientation information for a first player at a first physical location derived via to global position system information and second position and second orientation information for a second player at a second physical location to a virtual gaming space of a gaming application;
generating, by the processing system, a first virtual player corresponding to the first player and a second virtual player corresponding to the second player according to the mapping;
transmitting, by the system, information representative of the second virtual player to a first goggle device of the first player, wherein the first goggle device presents the second virtual player superimposed onto a transparent viewing apparatus for viewing of the virtual gaming space;
receiving, by the processing system, a first input stimulation of the first goggle device that is associated with the gaming application;
retrieving, by the system, a single input macro associated with the first goggle device for generating a substitute stimulation from the first input stimulation responsive to receiving the first input stimulation of the first goggle device; and
transmitting, by the processing system, the substitute stimulation to the gaming application.

20. The method of claim 19, further comprising:
identifying, by the processing system, a computer-controlled player that is generated by the gaming application;
mapping, by the processing system, virtual position and virtual orientation information for the computer-controlled player to that virtual gaming space to generated a computer-controlled virtual player; and
transmitting, to the first goggle device, by the system, information representative of the computer-controlled virtual player.

* * * * *